United States Patent
Kitano et al.

(10) Patent No.: US 9,724,968 B2
(45) Date of Patent: Aug. 8, 2017

(54) MULTILAYER STRUCTURE, INNER LINER FOR PNEUMATIC TIRE, AND PNEUMATIC TIRE

(75) Inventors: Hideki Kitano, Yoshikawa (JP); Tetsuo Amamoto, Kodaira (JP); Takatsugu Tanaka, Kokubunji (JP); Yuwa Takahashi, Higashiyamato (JP); Nahoto Hayashi, Kurashiki (JP); Masao Hikasa, Kibi chuo-cho (JP); Yusuke Tanaka, Kamisu (JP)

(73) Assignees: BRIDGESTONE CORPORATION, Tokyo (JP); Kuraray Co., Ltd., Kurashiki-Shi, Okayama (JP)

( * ) Notice: Subject to any disclaimer, the term of this patent is extended or adjusted under 35 U.S.C. 154(b) by 130 days.

(21) Appl. No.: 14/118,933

(22) PCT Filed: May 29, 2012

(86) PCT No.: PCT/JP2012/003511
§ 371 (c)(1),
(2), (4) Date: Nov. 20, 2013

(87) PCT Pub. No.: WO2012/164918
PCT Pub. Date: Dec. 6, 2012

(65) Prior Publication Data
US 2014/0096882 A1     Apr. 10, 2014

(30) Foreign Application Priority Data

May 31, 2011    (JP) ................................ 2011-122580
May 31, 2011    (JP) ................................ 2011-122763

(51) Int. Cl.
*B60C 1/00*      (2006.01)
*B60C 5/14*      (2006.01)
(Continued)

(52) U.S. Cl.
CPC .................. *B60C 5/14* (2013.01); *B32B 1/00* (2013.01); *B32B 25/08* (2013.01); *B32B 25/12* (2013.01);
(Continued)

(58) Field of Classification Search
CPC .... B60C 5/00; B60C 5/12; B60C 5/14; B60C 5/142; B60C 1/0008
See application file for complete search history.

(56) References Cited

U.S. PATENT DOCUMENTS 4,343,339 A *   8/1982   Schwindt ............... C08G 18/69
                                                       152/209.1
5,040,583 A      8/1991   Lin et al.
(Continued)

FOREIGN PATENT DOCUMENTS

CN       101511609 A     8/2009
CN       102046724 A     5/2011
(Continued)

OTHER PUBLICATIONS

Extended European Search Report, dated Nov. 7, 2014, issued in European Patent Application No. 12792915.6.
(Continued)

*Primary Examiner* — Justin Fischer
(74) *Attorney, Agent, or Firm* — Sughrue Mion, PLLC (57) ABSTRACT

To provide a multilayer structure that may adhere to rubber material without the necessity of providing an adhesive layer, an inner liner and a pneumatic tire using the multilayer structure. According to the present invention, a multilayer structure 1 is formed by alternately laminating elastomer layers 3 containing thermoplastic elastomer and barrier layers 2 containing a gas barrier resin, wherein an outermost layer 4 laminated uppermost among layers constituting the
(Continued)

multilayer structure 1 contains an elastomer component that may heat-adhere to diene rubber.

20 Claims, 3 Drawing Sheets

(51) Int. Cl.
| | |
|---|---|
| B32B 25/08 | (2006.01) |
| B32B 25/12 | (2006.01) |
| B32B 25/14 | (2006.01) |
| C08L 7/00 | (2006.01) |
| C08L 21/00 | (2006.01) |
| B32B 27/16 | (2006.01) |
| B32B 27/30 | (2006.01) |
| B32B 27/32 | (2006.01) |
| B32B 27/34 | (2006.01) |
| B32B 27/36 | (2006.01) |
| B32B 27/40 | (2006.01) |
| B32B 1/00 | (2006.01) |

(52) U.S. Cl.
CPC .............. *B32B 25/14* (2013.01); *B32B 27/16* (2013.01); *B32B 27/302* (2013.01); *B32B 27/306* (2013.01); *B32B 27/322* (2013.01); *B32B 27/34* (2013.01); *B32B 27/36* (2013.01); *B32B 27/40* (2013.01); *B60C 1/0008* (2013.04); *C08L 7/00* (2013.01); *C08L 21/00* (2013.01); *B32B 2250/42* (2013.01); *B32B 2274/00* (2013.01); *B32B 2307/7244* (2013.01); *B60C 2005/145* (2013.04); *Y10T 428/2495* (2015.01); *Y10T 428/269* (2015.01); *Y10T 428/31504* (2015.04); *Y10T 428/31826* (2015.04); *Y10T 428/31931* (2015.04)

(56) References Cited

U.S. PATENT DOCUMENTS

| | | | |
|---|---|---|---|
| 2005/0090616 A1 | 4/2005 | Dias et al. | |
| 2009/0165914 A1* | 7/2009 | Tomoi ................ | B29D 30/0681 152/510 |
| 2009/0308517 A1 | 12/2009 | Nohara et al. | |
| 2010/0186866 A1 | 7/2010 | Tomoi | |
| 2011/0024015 A1 | 2/2011 | Takahashi et al. | |

FOREIGN PATENT DOCUMENTS

| | | |
|---|---|---|
| EP | 0 337 279 A2 | 10/1989 |
| EP | 2 058 359 A1 | 5/2009 |
| EP | 2 060 411 A1 | 5/2009 |
| EP | 2 267 073 A1 | 12/2010 |
| EP | 2 623 315 A1 | 8/2013 |
| JP | 1-314164 A | 12/1989 |
| JP | 6-40207 A | 2/1994 |
| JP | 11-199713 A | 7/1999 |
| JP | 2002-524317 A | 8/2002 |
| JP | 2003-512201 A | 4/2003 |
| JP | 2004-176048 A | 6/2004 |
| JP | 2007509778 A | 4/2007 |
| JP | 2008-24228 A | 2/2008 |
| JP | 2008024217 A | 2/2008 |
| JP | 2009132379 A | 6/2009 |
| JP | 2009-263653 A | 11/2009 |
| JP | 2013-010350 A | 1/2013 |
| WO | 2007/100159 A1 | 9/2007 |
| WO | 2008/029939 A1 | 3/2008 |
| WO | 2012042679 A1 | 4/2012 |

OTHER PUBLICATIONS

Office Action issued on May 15, 2015 from the State Intellectual Property Office of P. R. China in corresponding Chinese Application No. 201280037996.2.
Communication dated Nov. 17, 2014 from the State Intellectual Property Office of P.R. China in counterpart Chinese Application No. 201280037996.2.
International Search Report for PCT/JP2012/003511 dated Jul. 24, 2012.
Communication dated Aug. 13, 2015 from the State Intellectual Property Office of the People's Republic of China in corresponding Chinese Application No. 201280037996.2.
Machine translation of JP-A-2002-524317 published Aug. 6, 2002.

* cited by examiner

MULTILAYER STRUCTURE, INNER LINER FOR PNEUMATIC TIRE, AND PNEUMATIC TIRE

CROSS REFERENCE TO RELATED APPLICATIONS

This application is a National Stage of International Application No. PCT/JP2012/003511 filed May 29, 2012, claiming priority based on Japanese Patent Application Nos. 2011-122580 filed May 31, 2011 and 2011-122763 filed May 31, 2011, the contents of all of which are incorporated herein by reference in their entirety.

TECHNICAL FIELD

The present invention relates to a multilayer structure comprising a barrier layer and an elastomer layer, and more specifically, to a multilayer structure that may adhere to rubber material, an inner liner for a pneumatic tire using the multilayer structure, and a pneumatic tire comprising the inner liner.

BACKGROUND ART

Conventionally, for the inner liner disposed as an air barrier layer on an inner surface of a tire for maintaining internal pressure of the tire, a rubber composition mainly made of butyl rubber or halogenated butyl rubber have been used. However, since the rubber composition mainly made of the butyl rubber has a low air barrier property, when the rubber composition is used for the inner liner, the inner liner needs to have a thickness of around 1 mm. Therefore, a weight ratio of the inner liner occupying the tire accounts for about 5%, which has been obstructing weight reduction of the tire for improving fuel efficiency of automobiles, agricultural vehicles, construction work vehicles and the like.

On the other hand, ethylene-vinyl alcohol copolymer (hereinafter, it may be abbreviated as EVOH) is known to have an excellent gas barrier property. Since an air transmission amount of the EVOH is hundredth part or less than that of the rubber composition used for a butyl-based inner liner, an inner liner made of EVOH with a thickness of 100 µm or less may significantly improve internal pressure retention of the tire and, simultaneously, enables weight reduction of the tire.

There are many resins with air permeability lower than that of butyl rubber. However, when the air permeability of the resin is about one tenth of that of the butyl-based inner liner, the inner liner needs to have a thickness greater than 100 µm, otherwise there is only a small effect of improving the internal pressure retention. On the other hand, when the inner liner has a thickness greater than 100 µm, there is only a small effect of reducing a tire weight and, moreover, the inner liner breaks or generates cracks due to deformation at the time of tire bending, making it difficult to maintain the barrier properties. Although there is disclosed a technique that, in order to improve bending resistance, uses elastomer in which a nylon resin with a melting point at 170-230° C. contains a halide of isobutylene-paramethylstyrene copolymer (Patent Document 1), there is a problem that, due to a high ratio of the elastomer with respect to the resin, while the bending resistance is improved, the barrier property of the nylon resin may not be maintained.

On the other hand, when the above EVOH is used, since the inner liner with a thickness of 100 µm or less may be used, the inner liner hardly breaks or generates cracks by bending deformation at the time of tire rolling. Therefore, it can be said that using EVOH for the inner liner of the tire in order to improve the internal pressure retention of the pneumatic tire is effective. For example, Patent Document 2 discloses a pneumatic tire comprising an inner liner made of EVOH.

Also, Patent Document 3 discloses that it is preferable to use an inner liner in which, in order to improve the internal pressure retention of a tire, an auxiliary layer made of elastomer adheres via an adhesive layer.

However, because of low adhesiveness between a resin film layer containing thermoplastic resin and a rubber-like elastic layer, there has been room for improvement in a peel-off effect.

Therefore, Patent Document 4, in order to improve the peel-off effect, discloses a laminated product having an adhesive layer composed of an adhesive composition (I) obtained by compounding, with respect to 100 parts by mass of a rubber component, 0.1 part by mass or more of at least one of maleimide derivative (H) having two or more reactive sites in molecules and poly-p-dinitrosobenzene.

RELATED ART DOCUMENTS

Patent Documents

Patent Document 1: Japanese Patent Laid-Open No. 11-199713
Patent Document 2: Japanese Patent Laid-Open No. 6-40207
Patent Document 3: Japanese Patent Laid-Open No. 2004-176048
Patent Document 4: Japanese Patent Laid-Open No. 2008-24228

SUMMARY OF INVENTION

Technical Problem

Here, although each of the techniques of Patent Documents 1-4 requires to provide an adhesive layer for adhering the inner liner to an inner surface of the pneumatic tire, it is preferable to eliminate volatile organic compound (VOC) contained in the adhesive. Further, in terms of eliminating complexity of adhesive coating process, a development of an inner liner which may adhere to the inner surface of the pneumatic tire without the necessity of providing the adhesive layer has been desired.

As such, an object of the present invention is to provide a multilayer structure that may adhere to the rubber material without the necessity of providing the adhesive layer. Another object of the present invention is to provide an inner liner for a pneumatic tire having such a multilayer structure and a pneumatic tire having such an inner liner.

Solution to Problem

As a result of intensive studies of a multilayer structure comprising a barrier layer and an elastomer layer in order to solve the above problems, the present inventors have found that, by further providing an outermost layer containing an elastomer component, which may heat-adhere to diene rubber, on a top layer among layers constituting the multilayer structure, excellent adhesion to rubber material may be achieved without separately providing an adhesive layer. The present inventors have thus accomplished the present invention.

Preferably, a thickness of the elastomer layers occupying the multilayer structure accounts for 80% or more.

Preferably, the elastomer component of the outermost layer is polymer having a vulcanizable diene moiety, and the outermost layer and a tire inner surface, to which the outermost layer adheres, adhere to each other by vulcanization.

Preferably, the elastomer component of the outermost layer has urethane bond. More preferably, the elastomer component is natural rubber, butadiene rubber, isoprene rubber, styrene-butadiene rubber, or modified polymers thereof.

The multilayer structure, wherein the barrier layer preferably has 100% or less elongation at break conforming to JIS K 7113 at 20° C. and 65% RH, and the elastomer layer has over 100% elongation at break conforming to JIS K 7113 at 20° C. and 65% RH.

Preferably, the multilayer structure is made by laminating the barrier layers and the elastomer layers to form seven or more layers in total. More preferably, the barrier layers and the elastomer layers are alternately laminated.

Preferably, the barrier layer and the elastomer layer are crosslinked by irradiation of active energy rays.

Preferably, the barrier layer has oxygen permeability of 10.0 cc·mm/m²·day·atm or less at 20° C. and 65% RH. Also preferably, the barrier layer has a thickness of 10 μm or less.

Preferably, gas barrier resin of the barrier layer is one or more resins having a polar group of carboxylic group, carbonyl group, an amino group, an amide residue, OH, S, CL or F. More preferably, the gas barrier resin is ethylene-vinyl alcohol copolymer, modified ethylene-vinyl alcohol copolymer, polyamide or polyvinyl alcohol.

Preferably, the gas barrier resin of the barrier layer has a hydroxyl group. More preferably, the elastomer component of the outermost layer has a modified group that may bond with the hydroxyl group of the gas barrier resin.

The multilayer structure, wherein the elastomer layer includes at least one selected from polystyrene-based thermoplastic elastomer, polyolefin-based thermoplastic elastomer, polydiene-based thermoplastic elastomer, polyvinyl chloride-based thermoplastic elastomer, chlorinated polyethylene-based thermoplastic elastomer, polyurethane-based thermoplastic elastomer, polyester-based thermoplastic elastomer, polyamide-based thermoplastic elastomer and fluorine resin-based thermoplastic elastomer.

Preferably, the inner liner is produced by co-extrusion molding.

An inner liner for a pneumatic tire according to the present invention is characterized in comprising the multilayer structure described above. A pneumatic tire according to the present invention is characterized in having the inner liner for a pneumatic tire described above.

Effect of the Invention

According to the multilayer structure, the inner liner for a tire and the pneumatic tire of the present invention, a multilayer structure that may adhere to the rubber material without the necessity of providing an adhesive layer may be provided. Also, an inner liner for a pneumatic tire using such a multilayer structure and a pneumatic tire having the inner liner may be provided.

DESCRIPTION OF EMBODIMENT

<Multilayer Structure>

Figure 1:
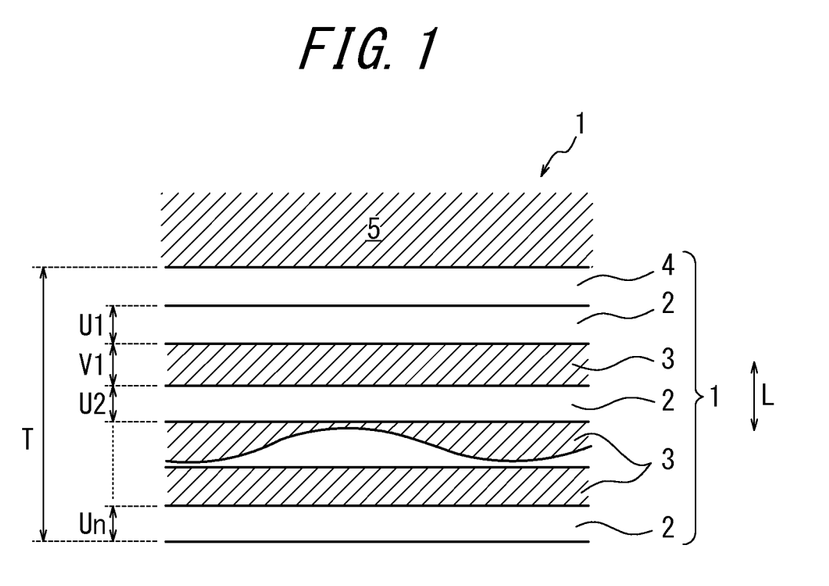
FIG. 1 is a cross-sectional view of an example of a multilayer structure according to the present invention.

An embodiment of the present invention will be described in detail with reference to the accompanying drawings. FIG. 1 is a cross-sectional view of an example of a multilayer structure according to the present invention.

A multilayer structure 1, as illustrated in FIG. 1, includes a barrier layer 2 and an elastomer layer 3.

The present invention is characterized in that an outermost layer as an uppermost layer, among layers 2, 3 and 4 constituting a laminated product 1, comprises an elastomer component capable of heat-adhering to diene rubber. Here, the uppermost layer of the multilayer structure 1 is a layer closest to a rubber material 5 among the layers 2, 3 and 4 and, in FIG. 1, corresponds to the outermost layer 4 located beneath the rubber material 5.

The above structure illustrated in FIG. 1 allows, when the inner liner 1 adheres to the rubber material 5, the elastomer component of the outermost layer 4 to bond with diene rubber contained in a rubber component of the rubber material 5. As a result, without separately providing an adhesive layer, high adhesion to an inner surface of a pneumatic tire may be obtained.

Further, the outermost layer 4, unlike adhesive layers formed in conventional inner liners, may be produced together with the barrier layer and the elastic layer constituting the laminated product by, for example, co-extrusion molding. Therefore, comparing to the conventional inner liners, there is an advantageous effect in terms of simplifying manufacturing process.

Also, by laminating the barrier layer 2 having a high gas barrier property and the elastomer layer 3 having high toughness, an excellent gas barrier property of the multilayer structure 1 is ensured and also, by a toughness action of the elastomer layer 3, high crack resistance may be obtained.

Further, in addition to the above effect, the multilayer structure 1 of the present invention may obtain excellent fatigue resistance. In a state in which the elastomer layer 3 made of a material with high flexibility such as rubber and the barrier layer 2 with low flexibility adhere to each other, when an extension strain is applied in a laminating direction L, while the elastomer layer 3 is elastically deformed and restores to its original shape, the barrier layer 2 is plastically deformed beyond a tolerance point. Here, when the elastomer layer 3 is thick enough comparing to the barrier layer 2, the elastic deformation becomes dominant in the entire multilayer structure and therefore the barrier layer 2 being plastically deformed is compressed and folded on the elastomer layer 3. The folded barrier layer 2, comparing to a conventional barrier layer 2, has higher resistance against a tensile stress in the laminating direction L, whereby elasticity of the entire multilayer structure is increased and plastic deformation may be efficiently suppressed. As a result, it is considered that extremely high fatigue resistance may be obtained.

Further, a ratio $((U_1+U_2+ \ldots +U_n)/T)$ of the thickness of the elastomer layers 3 occupying the multilayer structure 1 according to the present invention is preferably 80% or more.

This is because, when the ratio $((U1+U2+ \ldots +Un)/T)$ of the thickness of the elastomer layers 3 occupying the multilayer structure 1 is less than 80%, a desired fatigue resistance may not be obtained due to insufficient thickness of the elastomer layer 3. In terms of obtaining superior fatigue resistance, the ratio of the thickness of the elastomer layer is preferably 85% or more, more preferably 90% or more, particularly preferably 95% or more.

Figure 3:
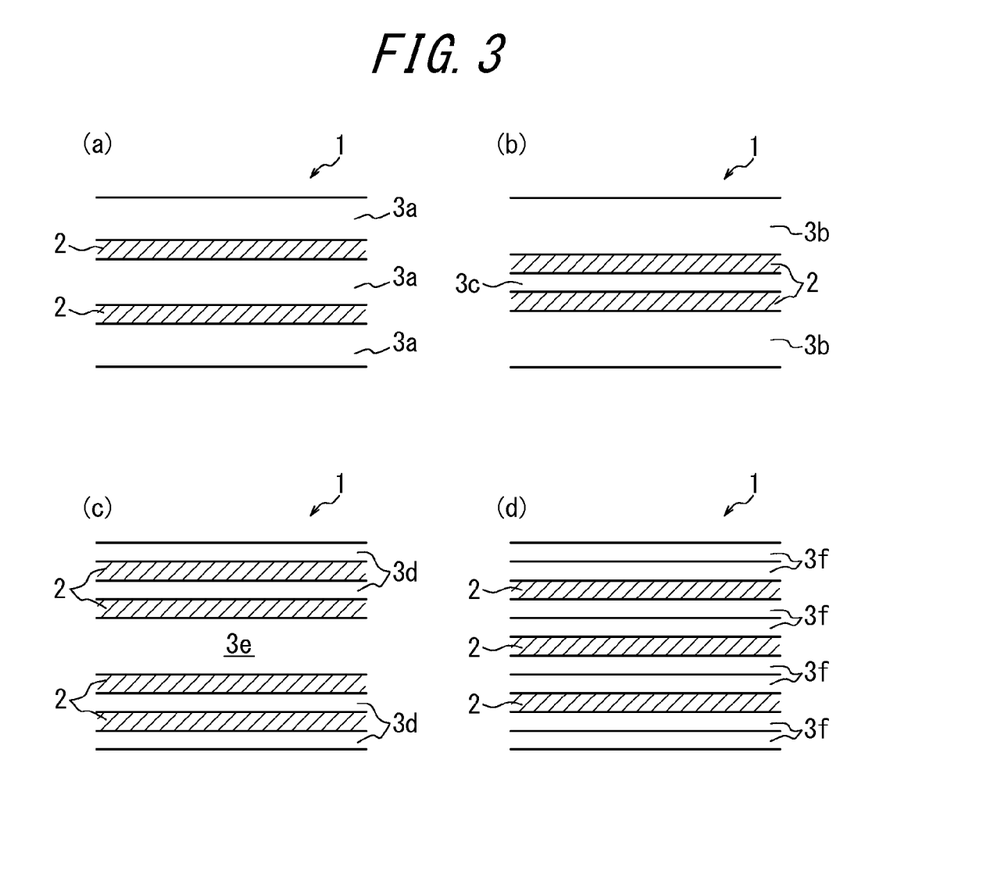
FIGS. 3(a)-(d) are diagrams respectively illustrating some embodiments of a multilayer structure according to the present invention.

For the multilayer structure 1 of the present invention, a lamination method to have the ratio of the thickness of the elastomer layer 80% or more, forms illustrated in FIGS. 3(a)-(d), for example, may be adopted. FIG. 3(a) illustrates a multilayer structure 1 having an elastomer layer 3a thicker than the barrier layer 2. FIG. 3(b) illustrates a multilayer structure 1 in which the barrier layers 2 and an elastomer layer 3c both having small thicknesses are sandwiched between thick elastomer layers 3b. FIG. 3(c) illustrates a multilayer structure 1 in which a thick elastomer layer 3e is arranged at a center in a laminating direction of the multilayer structure 1 and sandwiched between the barrier layer 2 and the elastomer layer 3d both having small thicknesses. FIG. 3(d) illustrates a multilayer structure 1 in which, comparing to the barrier layer 2, the number of elastomer layers 3f is greater.

Note that, among the laminating embodiments illustrated in FIGS. 3(a)-(d), in terms of obtaining superior fatigue resistance, the multilayer structure 1 illustrated in FIG. 3(b) in which the barrier layers 2 and the elastomer layer 3c are sandwiched between the thick elastomer layers 3b is more preferable.

For the multilayer structure 1 of the present invention, in terms of achieving a higher gas barrier property, it is preferable to laminate seven or more layers made from the elastomer layers 3 and the barrier layers 2 in total, more preferably eleven layers or more, particularly preferably fifteen layers or more. An upper limit of the total number of layers of the barrier layer 2 having the barrier property is preferably, but not particularly limited to, 3000 or less, in terms of reducing a weight of the multilayer structure 1.

Preferably, the barrier layers 2 and the elastomer layers 3 are alternately laminated, as illustrated in FIG. 1. This is because alternate lamination of the barrier layer 2 and the elastomer layer 3 enables obtainment of better barrier property and crack resistance.

According to the multilayer structure of the present invention, as illustrated in FIG. 1, each of thicknesses U1, U2, U3, . . . and Un of the elastomer layer 3 is preferably within a range of 0.001-100 μm, and each of thicknesses V1, V2, V3 . . . and Vn of the barrier layer 2 is preferably within a range of 0.001-40 μm. When each of the thickness U and the thickness V is within the above range, the crack resistance may be improved by enhancing the toughness and the number of layers constituting the multilayer structure may be increased. Therefore, comparing to a multilayer structure with the same thickness but formed by less number of layers, the gas barrier property and the crack resistance of the multilayer structure may be improved.

Also, in terms of achieving higher crack resistance, it is preferable to further reduce the thickness V of the barrier layer 2, more preferably 10 μm or less.

For example, although polystyrene may be mentioned as an example of a material used for a conventional barrier layer, polystyrene is known as a brittle material and a layer made of polystyrene may be broken at about 1.5% elongation at room temperature. However, in "Polymer, 1993, vol. 34 (10), 2148-2154", it is reported that, by laminating a layer made of ductile material and a layer made of polystyrene and limiting a thickness of the layer made of polystyrene to 1 μm or less, the brittleness of the layer made of polystyrene is reformed to become ductile. That is, it is considered that a layer made of a brittle material such as polystyrene may be reformed to have toughness when the thickness thereof is significantly reduced. The present inventors, by focusing on such a concept, have found a multilayer structure that may achieve both excellent gas barrier property and crack resistance.

As illustrated in FIG. 1, also, a thickness T of the whole multilayer structure 1 according to the present invention is preferably in a range of 0.1-1000 μm, more preferably in a range of 0.5-750 μm, particularly preferably in a range of 1-500 μm. The multilayer structure having a thickness within the ranges described above may be suitably used as an inner liner for a pneumatic tire and, in combination with limitation of an average thickness of each of the barrier layer and the elastomer layer, may have further improved gas barrier property and crack resistance.

Further, the barrier layer, the elastomer layer and the outermost layer constituting the multilayer structure of the present invention are preferably crosslinked by irradiation of active energy rays. By crosslinking the multilayer structure 1 by irradiation of the active energy rays, affinity between the laminated layers 2 and 3 is improved and high adhesion may be expressed. As a result, interlayer adhesion of the multilayer structure, and therefore the gas barrier property and the crack resistance of the multilayer structure may be significantly improved. Note that the active energy rays represent electromagnetic waves or charged particle beams having energy quantum and, as specific examples, ultraviolet, γ rays, electron beams and the like may be mentioned. Among them, the electron beam is preferable in terms of an effect of improving the interlayer adhesion. When irradiating the electron beams as the active energy rays, various electron beam accelerators of such as, for example, Cockroft-Walton type, Van de Graft type, a resonance transformer type, an insulated core transformer type, a linear type, Dynamitron type, a high frequency type and the like may be used as an electron beam source. An acceleration voltage is usually 100-500 kV, and irradiation dose is usually in a range of 5-600 kGy. In irradiating ultraviolet as the active energy rays, ultraviolet including wavelength of 190-380 nm is preferably used. The ultraviolet source may be, but not particularly limited to, for example, a high-pressure mercury lamp, a low pressure mercury lamp, a metal halide lamp, a carbon arc lamp or the like.

(Barrier Layer)

The barrier layer constituting the multilayer structure according to the present invention, in order to substantialize an air barrier property of the multilayer structure to maintain an internal pressure of the tire, is a layer containing a gas barrier resin.

Oxygen permeability of the barrier layer at 20° C. and 65% RH, in terms of ensuring high air barrier property of the multilayer structure, is preferably 10.0 cc·mm/m²·day·atm or less, more preferably 5.0 cc·mm/m²·day·atm or less, particularly preferably 1.0 cc·mm/m²·day·atm or less. When the oxygen permeability at 20° C. and 65% RH exceeds 10.0 cc·mm/m²·day·atm, it becomes necessary to thicken the barrier layer to enhance the internal pressure retention of the tire, hindering sufficient weight reduction of the inner liner.

Also, the material having the gas barrier property is not particularly limited, as long as capable of ensuring a desired air barrier property. As the polymer material, for example, polyamide resin, ethylene-vinyl alcohol copolymer, modified ethylene-vinyl alcohol copolymer, urethane polymer, olefin polymer, diene polymer and the like may be mentioned. Those resins may be used alone, or in combination with one or more other resins.

Further, the gas barrier resin is preferably at least one kind of a resin having a polar group of a carboxyl group, a carbonyl group, an amino group, OH, S, Cl or F. Or, resin having the gas barrier property may be a resin having a metal ion. This is because, when the gas barrier resin has these polar groups, cohesive energy density is increased and, as a result, the gas barrier property may be further improved.

Further, the resin having the polar group is preferably ethylene-vinyl alcohol copolymer, modified ethylene-vinyl alcohol copolymer, polyamide or polyvinyl alcohol. This is because these resins have a low air transmission amount and excellent gas barrier property.

The ethylene-vinyl alcohol copolymer (EVOH) has ethylene content at preferably 25 to 50 mol %, more preferably 30 to 48 mol %, particularly preferably 35 to 45 mol %. When the ethylene content is less than 25 mol %, the crack resistance, the fatigue resistance and melt-moldability may be deteriorated and, when the ethylene content exceeds 50 mol %, sufficient gas barrier property may not be ensured. Also, the ethylene-vinyl alcohol copolymer preferably has saponification degree at 90% or more, more preferably 95% or more, particularly preferably 99% or more. When the saponification degree is under 90%, the gas barrier property and thermal stability during molding may be insufficient. Further, the ethylene-vinyl alcohol copolymer has a melt flow rate (MFR) at, at 190° C. under a load of 2160 g, preferably 0.1-30 g/10 minutes, more preferably 0.3-25 g/10 minutes.

Ethylene content of the ethylene-vinyl alcohol copolymer, in terms of improving the gas barrier property, melt moldability and the interlayer adhesion of the inner liner, is preferably 3 to 70 mol %, more preferably 10 to 60 mol %, further preferably 20 to 55 mol %, particularly preferably 25 to 50 mol %. When the ethylene content is less than 3 mol %, there is a risk of deteriorating water resistance and hot water resistance of the inner liner, as well as the gas barrier property and the melt moldability at high humidity. On the other hand, when the ethylene content exceeds 70 mol %, the gas barrier property of the inner liner may possibly be reduced.

In terms of improving the gas barrier property, humidity resistance and the interlayer adhesion of the inner liner, a saponification degree of the ethylene-vinyl alcohol copolymer is preferably 80% or more, more preferably 90% or more, further preferably 95% or more, particularly preferably 99% or more. Also, the saponification degree of the ethylene-vinyl alcohol copolymer is preferably 99.99% or less. When the saponification degree of EVOH is less than 80%, there is a risk of deteriorating the melt moldability, the gas barrier property, coloring resistance and the humidity resistance of the inner liner.

In terms of obtaining the gas barrier property, the crack resistance and the fatigue resistance, a melt flow rate (MFR) of the ethylene-vinyl alcohol copolymer at 190° C. under a load of 21.18N is preferably 0.1-30 g/10 minutes, more preferably 0.3-25 g/10 minutes.

In the ethylene-vinyl alcohol copolymer, 1,2-glycol bond structural unit content G (mol %) preferably satisfies the following formula:

$$G \leq 1.58 - 0.0244 \times E$$

[in the formula, G represents the 1,2-glycol bond structural unit content (mol %), and E represents ethylene unit content (mol %) in the EVOH, where E≤64 is satisfied] and, simultaneously, intrinsic viscosity is preferably in a range of 0.05-0.2 L/g. By using such EVOH, a resulting inner liner has less humidity dependency of the gas barrier property and has excellent transparency and gloss, thereby facilitating lamination to a layer made of a different resin. Note that the 1,2-glycol bond structural unit content may be measured by, in accordance with a method described in "S. Aniya et al, Analytical Science Vol. 1, 91 (1985)", a nuclear magnetic resonance method at 90° C. having dimethyl sulfoxide solution as an EVOH sample.

The modified ethylene-vinyl alcohol copolymer is a polymer containing, in addition to ethylene unit and vinyl alcohol unit, one or more repeating units (hereinafter, also referred to as a structural unit) such as, for example, repeat units induced from these units. Note that, for the modified EVOH, suitable ethylene content, saponification degree, melt flow rate (MFR), 1,2-glycol bond structural unit content and intrinsic viscosity are similar to those of EVOH described above.

The modified EVOH preferably has at least one structural unit selected from, for example, a structural unit (I) and a structural unit (II) shown below, and more preferably contains the structural unit at a ratio of 0.5 to 30 mol % of a total structural units. Such a modified EVOH may improve flexibility and moldability of a resin or a resin composition, the interlayer adhesion, stretchability and thermoformability of the inner liner.

[Chemical formula 1]

Each of $R^1$, $R^2$ and $R^3$ in the above formula (I) independently represents a hydrogen atom, an aliphatic hydrocarbon group having 1 to 10 carbon atoms, an alicyclic hydrocarbon group having 3 to 10 carbon atoms, an aromatic hydrocarbon group having 6 to 10 carbon atoms, or a hydroxy group. Also, one pair of $R^1$, $R^2$ or $R^3$ may be combined together (excluding a pair of $R^1$, $R^2$ or $R^3$ in which both of them are hydrogen atoms). Further, the aliphatic hydrocarbon group having 1 to 10 carbon atoms, the alicyclic hydrocarbon group having 3 to 10 carbon atoms, or the aromatic hydrocarbon group having 6 to 10 carbon atoms may have the hydroxy group, a carboxy group or a halogen atom. On the other hand, each of R4, R5, R6 and R7 in the above formula (II) independently represents the hydrogen atom, the aliphatic hydrocarbon group having 1 to 10 carbon atoms, the alicyclic hydrocarbon group having 3 to 10 carbon atoms, the aromatic hydrocarbon group having 6 to 10 carbon atoms, or the hydroxy group. R4 and R5, or R6 and R7 may be combined together (excluding when both R4 and R5 or both R6 and R7 are hydrogen atoms). Also, the aliphatic hydrocarbon group having 1 to 10 carbon atoms, the alicyclic hydrocarbon group having 3 to 10 carbon atoms, or the aromatic hydrocarbon group having 6 to 10 carbon atoms may have the hydroxy group, an alkoxy group, the carboxy group or the halogen atom.

In the modified EVOH, a lowest limit of an amount of the structure unit (I) and/or (II) with respect to the total structural units is preferably 0.5 mol %, more preferably 1 mol %, particularly preferably 1.5 mol %. On the other hand, in the modified EVOH, the highest limit of the amount of the structure unit (I) and/or (II) with respect to the total structural units is preferably 30 mol %, more preferably 15 mol %, particularly preferably 10 mol %. When the specific amount of the structural unit (I) and/or (II) described above are contained, the flexibility and processing characteristics of the resin or the resin composition, as well as the interlayer adhesion of the inner liner, the stretchability and the thermoformability, may be improved.

For the structural units (I) and (II), as the aliphatic hydrocarbon group having 1 to 10 carbon atoms, an alkyl group, an alkenyl group and the like may be mentioned. As the alicyclic hydrocarbon group having 3 to 10 carbon atoms, a cycloalkyl group, a cycloalkenyl group and the like may be mentioned. As the aromatic hydrocarbon group having 6 to 10 carbon atoms, a phenyl group and the like may be mentioned.

In the structural unit (I), preferably, each of $R^1$, $R^2$ and $R^3$ independently represents a hydroxyethyl atom, a methyl group, an ethyl group, the hydroxy group, a hydroxymethyl group or a hydroxyethyl group. Among them, preferably, each of $R^1$, $R^2$ and $R^3$ independently represents the hydrogen atom, the methyl group, the hydroxy group or the hydroxymethyl group. Such $R^1$, $R^2$ and $R^3$ may further improve the stretchability and the thermoformability of the inner liner.

A method for incorporating the structural unit (I) in the EVOH may be, but not particularly limited to, for example, during copolymerization of ethylene and vinyl ester, a method of further copolymerizing a monomer induced by the structural unit (I). The monomer induced by the structural unit (I) may be, for example, alkenes such as propylene, butylene, pentene, hexene and the like; alkens having the ester group or the hydroxy group such as 3-hydroxy-1-propene, 3-acyloxy-1-propene, 3-acyloxy-1-butene, 4-acyloxy-1-butene, 3,4-diacyloxy-1-butene, 3-acyloxy-4-hydroxy-1-butene, 4-acyloxy-3-hydroxy-1-butene, 3-acyloxy-4-methyl-1-butene, 4-acyloxy-2-methyl-1-butene, 4-acyloxy-3-methyl-1-butene, 3,4-diacyloxy-2-methyl-1-butene, 4-hydroxy-1-pentene, 5-hydroxy-1-pentene, 4,5-dihydroxy-1-pentene, 4-acyloxy-1-pentene, 5-acyloxy-1-pentene, 4,5-diacyloxy-1-pentene, 4-hydroxy-3-methyl-1-pentene, 5-hydroxy-3-methyl-1-pentene, 4,5-dihydroxy-3-methyl-1-pentene, 5,6-dihydroxy-1-hexene, 4-hydroxy-1-hexene, 5-hydroxy-1-hexene, 6-hydroxy-1-hexene, 4-acyloxy-1-hexene, 5-acyloxy-1-hexene, 6-acyloxy-1-hexene, 5,6-diacyloxy-1-hexene and the like. Among them, in terms of copolymerization reactivity and the gas barrier property of the resulting inner liner, propylene, 3-acyloxy-1-propene, 3-acyloxy-1-butene, 4-acyloxy-1-butene, and 3,4-diacyloxy-1-butene are preferred. Specifically, propylene, 3-acetoxy-1-propene, 3-acetoxy-1-butene, 4-acetoxy-1-butene, 3,4-diacetoxy-1-butene are more preferable, and 3,4-diacetoxy-1-butene is particularly preferable. Note that, in using alkene having ester, during a saponification reaction, the monomer is induced by the structural unit (I).

In the structural unit (II) described above, both $R^5$ and $R^4$ are preferably hydrogen atoms. More preferably, both $R^5$ and $R^4$ are hydrogen atoms, and one of $R^6$ and $R^7$ is an aliphatic hydrocarbon group having 1 to 10 carbon atoms and the other is a hydrogen atom. The aliphatic hydrocarbon group in the structural unit (II) is preferably the alkenyl group or the alkyl group. Also, in terms of placing importance on the gas barrier property of the inner liner, one of R6 and R7 is preferably the methyl group or the ethyl group and the other is the hydrogen atom. Further, it is also preferable that one of $R^6$ and $R^7$ is a substituent group represented by $(CH_2)_hOH$ (h is an integer of 1 to 8) and the other is the hydrogen atom. In the substituent group represented by $(CH_2)_hOH$, h is preferably an integer of 1 to 4, more preferably 1 or 2, particularly preferably 1.

A method for incorporating the structural unit (II) in the EVOH may be, but not particularly limited to, a method to react a monovalent epoxy compound to EVOH obtained by the saponification reaction. The monovalent epoxy compound may be preferably a compound represented by any of the following formulas (III) to (IX).

[Chemical formula 2]

In the above formulas (III) to (IX), $R^8$, $R^9$, $R^{10}$, $R^{11}$ and $R^{12}$ represent the hydrogen atom, the aliphatic hydrocarbon group (the alkyl group or the alkenyl group) having 1 to 10 carbon atoms, the alicyclic hydrocarbon group (the cycloalkyl group or the cycloalkenyl group) having 3 to 10 carbon atoms, or the aromatic hydrocarbon group (the phenyl group and the like) having 6 to 10 carbon atoms. Note that $R^8$, $R^9$, $R^{10}$, $R^{11}$ and $R^{12}$ may be identical or different from each other. Also, i, j, k, p and q represent integers of 1-8.

The monovalent epoxy compound represented by the above formula (III) may be, for example, epoxyethane (ethylene oxide), epoxypropane, 1,2-epoxybutane, 2,3-epoxybutane, 3-methyl-1,2-epoxybutane, 1,2-epoxypentane, 2,3-epoxypentane, 3-methyl-1,2-epoxypentane, 4-methyl-1,2-epoxypentane, 4-methyl-2,3-epoxypentane, 3-ethyl-1,2-epoxypentane, 1,2-epoxyhexane, 2,3-epoxyhexane, 3,4-epoxyhexane, 3-methyl-1,2-epoxyhexane, 4-methyl-1,2- epoxyhexane, 5-methyl-1,2-epoxyhexane, 3-ethyl-1,2-epoxyhexane, 3-propyl-1,2-epoxyhexane, 4-ethyl-1,2-epoxyhexane, 5-methyl-1,2-epoxyhexane, 4-methyl-2,3-epoxyhexane, 4-ethyl-2,3-epoxyhexane, 2-methyl-3,4-epoxyhexane, 2,5-dimethyl-3,4-epoxyhexane, 3-methyl-1,2-epoxyheptane, 4-methyl-1,2-epoxyhexane, 5-methyl-1,2-epoxyheptane, 6-methyl-1,2-epoxyheptane, 3-ethyl-1,2-epoxyheptane, 3-propyl-1,2-epoxyheptane, 3-butyl-1,2-epoxyheptane, 4-ethyl-1,2-epoxyheptane, 4-propyl-1,2-epoxyheptane, 6-ethyl-1,2-epoxyheptane, 4-methyl-2,3-epoxyheptane, 4-ethyl-2,3-epoxyheptane, 4-propyl-2,3-epoxyheptane, 2-methyl-3,4-epoxyheptane, 5-methyl-3,4-epoxyheptane, 5-ethyl-3,4-epoxyheptane, 2,5-dimethyl-3,4-epoxyheptane, 2-methyl-5-ethyl-3,4-epoxyheptane, 1,2-epoxyheptane, 2,3-epoxyheptane, 3,4-epoxyheptane, 1,2-epoxyoctane, 2,3-epoxyoctane, 3,4-epoxyoctane, 4,5-epoxyoctane, 1,2-epoxynonane, 2,3-epoxynonane, 3,4-epoxynonane, 4,5-epoxynonane, 1,2-epoxydecane, 2,3-epoxydecane, 3,4-epoxydecane, 4,5-epoxydecane, 5,6-epoxydecane, 1,2-epoxyundecane, 2,3-epoxyundecane, 3,4-epoxyundecane, 4,5-epoxyundecane, 5,6-epoxyundecane, 1,2-epoxydodecane, 2,3-epoxydodecane, 3,4-epoxydodecane, 4,5-epoxydodecane, 5,6-epoxydodecane, 6,7-epoxydodecane, epoxyethylbenzene, 1-phenyl-1,2-propane, 3-phenyl-1,2-epoxypropane, 1-phenyl-1,2-epoxybutane, 3-phenyl-1,2-epoxypentane, 4-phenyl-1,2-epoxypentane, 5-phenyl-1,2-epoxypentane, 1-phenyl-1,2-epoxyhexane, 3-phenyl-1,2-epoxyhexane, 4-phenyl-1,2-epoxyhexane, 5-phenyl-1,2-epoxyhexane, 6-phenyl-1,2-epoxyhexane, or the like.

The monovalent epoxy compound represented by the above formula (IV) may be, for example, methyl glycidyl ether, ethyl glycidyl ether, n-propyl glycidyl ether, isopropyl glycidyl ether, n-butyl glycidyl ether, isobutyl glycidyl ether, tert-butyl glycidyl ether, 1,2-epoxy-3-pentyloxypropane, 1,2-epoxy-3-hexyloxypropane, 1,2-epoxy-3-heptyloxypropane, 1,2-epoxy-4-phenoxybutane, 1,2-epoxy-4-benzyloxybutane, 1,2-epoxy-5-methoxypentane, 1,2-epoxy-5-ethoxypentane, 1,2-epoxy-5-propoxypentane, 1,2-epoxy-5-butoxypentane, 1,2-epoxy-5-pentyloxypentane, 1,2-epoxy-5-hexyloxypentane, 1,2-epoxy-5-phenoxypentane, 1,2-epoxy-6-methoxyhexane, 1,2-epoxy-6-ethoxyhexane, 1,2-epoxy-6-propoxyhexane, 1,2-epoxy-6-butoxyhexane, 1,2-epoxy-6-heptyloxyhexane, 1,2-epoxy-7-methoxyheptane, 1,2-epoxy-7-ethoxyheptane, 1,2-epoxy-7-propoxyheptane, 1,2-epoxy-7-butoxyheputane, 1,2-epoxy-8-methoxyoctane, 1,2-epoxy-8-ethoxyoctane, 1,2-epoxy-8-butoxyoctane, glycidol, 3,4-epoxy-1-butanol, 4,5-epoxy-1-pentanol, 5,6-epoxy-1-hexanol, 6,7-epoxy-1-heptanol, 7,8-epoxy-1-octanol, 8,9-epoxy-1-nonanol, 9,10-epoxy-1-decanol, 10,11-epoxy-1-undecanol, or the like.

The monovalent epoxy compound represented by the above formula (V) may be, for example, ethylene glycol monoglycidyl ether, propanediol monoglycidyl ether, butanediol monoglycidyl ether, pentanediol monoglycidyl ether, hexanediol monoglycidyl ether, heptanediol monoglycidyl ether, octanediol monoglycidyl ether, or the like.

The monovalent epoxy compound represented by the above formula (VI) may be, for example, 3-(2,3-epoxy)propoxy-1-propene, 4-(2,3-epoxy)propoxy-1-butene, 5-(2,3-epoxy)propoxy-1-pentene, 6-(2,3-epoxy)propoxy-1-hexene, 7-(2,3-epoxy)propoxy-1-heptene, 8-(2,3-epoxy)propoxy-1-octene, or the like.

The monovalent epoxy compound represented by the above formula (VII) may be, for example, 3,4-epoxy-2-butanol, 2,3-epoxy-1-butanol, 3,4-epoxy-2-pentanol, 2,3-epoxy-1-pentanol, 1,2-epoxy-3-pentanol, 2,3-epoxy-4-methyl-1-pentanol, 2,3-epoxy-4,4-dimethyl-1-pentanol, 2,3-epoxy-1-hexanol, 3,4-epoxy-2-hexanol, 4,5-epoxy-3-hexanol, 1,2-epoxy-3-hexanol, 2,3-epoxy-4,4-dimethyl-1-hexanol, 2,3-epoxy-4,4-diethyl-1-hexanol, 2,3-epoxy-4-methyl-4-ethyl-1-hexanol, 3,4-epoxy-5-methyl-2-hexanol, 3,4-epoxy-5,5-dimethyl-2-hexanol, 3,4-epoxy-2-heptanol, 2,3-epoxy-1-heptanol, 4,5-epoxy-3-heptanol, 2,3-epoxy-4-heptanol, 1,2-epoxy-3-heptanol, 2,3-epoxy-1-octanol, 3,4-epoxy-2-octanol, 4,5-epoxy-3-octanol, 5,6-epoxy-4-octanol, 2,3-epoxy-4-octanol, 1,2-epoxy-3-octanol, 2,3-epoxy-1-nonanol, 3,4-epoxy-2-nonanol, 4,5-epoxy-3-nonanol, 5,6-epoxy-4-nonanol, 3,4-epoxy-5-nonanol, 2,3-epoxy-4-nonanol, 1,2-epoxy-3-nonanol, 2,3-epoxy-1-decanol, 3,4-epoxy-2-decanol, 4,5-epoxy-3-decanol, 5,6-epoxy-4-decanol, 6,7-epoxy-5-decanol, 3,4-epoxy-5-decanol, 2,3-epoxy-4-decanol, 1,2-epoxy-3-decanol, or the like.

The monovalent epoxy compound represented by the above formula (IX) may be, for example, 3,4-epoxycyclopentene, 3,4-epoxycyclohexene, 3,4-epoxycycloheptene, 3,4-epoxycyclooctene, 3,4-epoxycyclononene, 1,2-epoxycyclodecene, 1,2-epoxycycloundecene, 1,2-epoxycyclododecene, or the like.

The monovalent epoxy compound represented by the above formula (IX) may be, for example, 3,4-epoxycyclopentene, 3,4-epoxycyclohexene, 3,4-epoxycycloheptene, 3,4-epoxycyclooctene, 3,4-epoxycyclononane, 1,2-epoxycyclodecene, 1,2-epoxycycloundecane, 1,2-epoxycyclododecene, or the like.

Among the monovalent epoxy compounds set forth above, epoxy compounds having 2-8 carbon atoms are preferred. In particular, in terms of facilitating handling the compound and reactivity to EVOH, the number of carbon atoms of the monovalent epoxy compound is more preferably 2-6, particularly preferably 2-4. Also, the monovalent epoxy compound is particularly preferably a compound expressed by the formula (III) or the formula (IV) among compounds represented by above formulas. Specifically, in terms of reactivity to EVOH and the gas barrier property of a resulting inner liner, 1,2-epoxybutane, 2,3-epoxybutane, epoxypropane, epoxyethane and glycidol are preferable and, among them, epoxypropane and glycidol are particularly preferable.

According to the present invention, ethylene-vinyl alcohol copolymer may be obtained by polymerizing ethylene and vinylester to obtain ethylene-vinylester copolymer and saponifying the ethylene-vinylester copolymer. Further, modified ethylene-vinyl alcohol copolymer may be obtained by, as described above, (1) during polymerization of ethylene and vinylester, further copolymerizing a monomer induced by the structural unit (I), or (2) reacting a monovalent epoxy compound to EVOH obtained by the saponification reaction. Here, a polymerization method of ethylene-vinyl alcohol copolymer or modified ethylene-vinyl alcohol copolymer may be any one of, but not particularly limited to, for example, solution polymerization, suspension polymerization, emulsion polymerization and bulk polymerization. Also, the method may be either a continuous mode or a batch-wise mode.

Vinylester that may be used for the polymerization may be fatty acid vinyl such as vinyl acetate, vinyl propionate, vinyl pivalate and the like.

Further, in producing modified ethylene-vinyl alcohol copolymer, in addition to ethylene and vinylester, preferably a small amount of a monomer that may be copolymerized with monomers thereof may be used. The monomer that may be copolymerized with the monomers of ethylene and vinylester may be, in addition to monomers induced by the aforementioned structural unit (I), other alkenes; unsaturated carboxylic acid such as acrylic acid, methacrylic acid, crotonic acid, maleic acid and itaconic acid, or an anhydride thereof, or a salt thereof, monoalkylester, dialkylester and the like; nitriles such as acrylonitrile and methacrylonitrile; amides such as acrylamide, methacrylamide and the like; olefine sulfonic acid such as vinyl sulfonic acid, allylsulfonic acid, methallyl sulfonic acid and the like or a salt thereof; alkylvinylethers, vinyl ketones, N-vinylpyrrolidone, vinyl chloride, vinylidene chloride and the like. Further, vinylsilane compound may be used as a monomer, and an amount of vinylsilane compound introduced into the copolymer is preferably from 0.0002 mol % to 0.2 mol %. The vinylsilane compound may be, for example, vinyl trimethoxysilane, vinyl triethoxysilane, vinyl tri(β-methoxy-ethoxy)silane, γ-methacryloyloxypropyl methoxysilane, or the like. Among these vinylsilane compounds, vinyl trimethoxysilane and vinyl triethoxysilane are preferable.

Solvents that can be used for the polymerization is not particularly limited, as long as it is an organic solvent that may dissolve ethylene, vinyl ester and ethylene-vinyl ester copolymer. Specifically, alcohols such as methanol, ethanol, propanol, n-butanol and tert-butanol; dimethyl sulfoxide and the like may be mentioned. Among them, in terms of facilitating removal and separation after reaction, methanol is particularly preferred.

Initiators that may be used for the polymerization may be, for example, azonitorile based initiators such as 2,2'-azobisisobutyronitrile, 2,2'-azobis-(2,4-dimethyl valeronitrile), 2,2'-azobis-(4-methoxy-2,4-dimethyl valeronitrile), 2,2'-azobis-(2-cyclopropyl propionitrile) and the like; or organic peroxide initiators such as isobutyryl peroxide, cumyl peroxyneodecanoate, diisopropyl peroxycarbonate, di-n-propyl peroxydicarbonate, t-butyl peroxyneodecanoate, lauroyl peroxide, benzoyl peroxide, t-butyl hydroperoxide and the like.

Polymerization temperature is typically about 20-90° C., preferably 40-70° C. Polymerization time is typically about 2-15 hours, preferably 3-11 hours. A polymerization rate to the vinyl ester used as a basis is typically about 10-90%, preferably 30-80%. Resin content in the solution after the polymerization is about 5-85 mass %, preferably 20-70 mass %.

After polymerization for a predetermined time or after reaching a predetermined polymerization rate, polymerization inhibitor is added to a resulting copolymer solution as necessary, and unreacted ethylene gas is removed by evaporation, followed by removal of unreacted vinyl ester. An applicable method of removing the unreacted vinyl ester is, for example, a method to continuously supply the copolymer solution at a constant speed from a top of a column packed with Raschig ring and to blow organic solvent vapor such as methanol and the like from a bottom of the column, such that mixed vapor of the organic solvent such as methanol and the like and unreacted vinyl ester is distilled from the top of the column and copolymer solution from which the unreacted vinyl ester is removed is extracted from the button of the column.

Next, an alkali catalyst is added to the copolymer solution, such that the copolymer in the solution is saponified. A method of saponification may be of either continuous mode or batch-wise mode. The alkali catalyst may be, for example, sodium hydroxide, potassium hydroxide, alkali metal alcoholates or the like. Further, preferable conditions of the saponification are, for the batch-wise mode, for example, a concentration of the alkali catalyst in the copolymer solution is about 10-50 mass %, reaction temperature is about 30-65° C., an amount of catalyst to be used is about 0.02-1.0 moles per mole of vinyl ester structural unit, and the saponification time is about 1-6 hours.

Since the (modified) EVOH after saponification contains the alkali catalyst, byproduct salts such as sodium acetate and potassium acetate, and other impurities, these chemicals are preferably neutralized or removed by washing as needed. Here, when the (modified) EVOH after saponification is washed in the water such as ion-exchanged water that hardly contains metal ions, chloride ions and the like, some of sodium acetate, potassium acetate and the like may remain in the EVOH.

The polyamide resin (PA) is a general term for polymer compounds having an amide bond, which is a resultant of a reaction of acid and amine, and characterized in having an excellent mechanical property and resistance against tensile, compression, bend and impact. In terms of improving the gas barrier property, the melt moldability and the interlayer adhesion of the inner liner, the melt flow rate (JIS K 7210 1999 (230° C., 21.18N)) of the PA is preferably 100 g/10 minutes, more preferably 30 g/10 minutes.

As specific types of the polyamide resin, for example, nylon 6, nylon 6-66, nylon MXD6, aromatic polyamide and the like may be mentioned.

The polyvinyl alcohol resin (PVA) is a type of synthetic resins and characterized in being extremely highly hydrophilic and soluble in warm water. In terms of improving the gas barrier property, the melt moldability and the interlayer adhesion of the inner liner, the saponification degree thereof is preferably 95 mol % or less, more preferably 90 mol % or less.

According to the present invention, the polyvinyl alcohol resin may be obtained by, for example, saponifying polyvinyl acetate obtained by polymerizing vinyl acetate monomers.

Also, elongation at break (EB) of the barrier layer is preferably 100% or less. This is because, when the elongation at break exceeds 100%, there is a possibility that a high gas barrier property may not be secured. Here, the elongation at break (EB) represents elongation of a sample with a thickness of 1 mm under the conditions of 20° C. and 65% RH conforming to JIS K 7113 when the sample breaks, measured at a tensile rate of 500 mm/min by using the dumbbell of JIS No. 3.

(Elastomer Layer)

The elastomer layer constituting the multilayer structure of the present invention is a layer for imparting the flexibility and the crack resistance to the multilayer structure and may be, for example, a layer made of thermoplastic elastomer or a layer made of a polymer material in which the thermoplastic elastomer presents in a matrix manner. Note that the matrix means a continuous phase.

The barrier layer described above has a high gas barrier property and is very effective in improving the internal pressure retention of the tire. However, since the barrier layer has a significantly high elastic modulus comparing to that of rubber in the tire, there is a risk of breaking or generating cracks due to deformation during bending. Therefore, by laminating the elastomer layer together with the barrier layer, high internal pressure retention and crack resistance of the multilayer structure may be ensured.

Also, the elongation at break (EB) of the elastomer layer preferably exceeds 100%. When the elongation at break (EB) is less than 100%, due to insufficient flexibility of the elastomer layer, a desired fatigue resistance may not be obtained. Here, the elongation at break (EB) represents elongation of a sample with a thickness of 1 mm under the conditions of 20° C. and 65% RH conforming to JIS K 7113 when the sample breaks, measured at a tensile rate of 500 mm/min by using the dumbbell of JIS No. 3.

Preferably, air permeability of the elastomer layer at 20° C. and 65% RH is 10.0 cc·mm/m²·day·atm or less. This is because, when the air permeability exceeds 10.0 cc·mm/m²·day·atm, there is a risk that, when cracks are generated in the barrier layer, a rapid reduction of the internal pressure may not be prevented.

The elastomer component comprised in the elastomer layer may be, but not particularly limited to, for example, polystyrene-based thermoplastic elastomer, polyolefin-based thermoplastic elastomer, polydiene-based thermoplastic elastomer, polyvinyl chloride-based thermoplastic elastomer, chlorinated polyethylene-based thermoplastic elastomer, polyurethane-based thermoplastic elastomer, polyester-based thermoplastic elastomer, polyamide-based thermoplastic elastomer, fluorocarbon resin-based thermoplastic elastomer and the like. Among them, polyurethane-based thermoplastic elastomer is preferred. Note that those thermoplastic elastomers may be used alone, or in combination with of one or more other thermoplastic elastomers.

The polystyrene-based thermoplastic elastomer has an aromatic vinyl polymer block (hard segment) and a rubber block (soft segment), where an aromatic vinyl polymer portion forms a physical crosslinking and functions as a bridging point, while the rubber block imparts rubber elasticity. The polystyrene-based thermoplastic elastomer may be sorted by an array format of the soft segment in the molecule, and may be, for example, styrene-butadiene-styrene block copolymer (SBS), styrene-isoprene-styrene block copolymer (SIS), styrene-isobutylene-styrene block copolymer (SIBS), styrene-ethylene/butylene-styrene block copolymer (SEBS), styrene-ethylene/propylene-styrene block copolymer (SEPS) or the like. Further, a block copolymer of crystalline polyethylene, which is obtained by hydrogenating a block copolymer of polybutadiene and butadiene-styrene random copolymer, and ethylene/butylene-styrene random copolymer; and di-block copolymer of, for example, crystalline polyethylene, which is obtained by hydrogenating a block copolymer of polybutadiene or ethylene-butadiene random copolymer, and polystyrene, are also included. Among them, in terms of a balance of mechanical strength, heat stability, weather resistance, chemical resistance, the gas barrier property, flexibility and workability, styrene-isobutylene-styrene block copolymer (SIBS), styrene-ethylene/butylene-styrene block copolymer (SEBS), and styrene-ethylene/propylene-styrene block copolymer (SEPS) are preferable.

The polyolefin-based thermoplastic elastomer includes thermoplastic elastomer containing a polyolefin block such as polypropylene, polyethylene and the like as the hard segment and a rubber block such as ethylene-propylene-diene copolymer and the like as the soft segment. Incidentally, such thermoplastic elastomer is classified into a blend type and an implant type. Further, as the polyolefin-based thermoplastic elastomer, maleic anhydride modified ethylene-butene-1 copolymer, maleic anhydride modified ethylene-propylene copolymer, halogenated butyl rubber, modified polypropylene, modified polyethylene, and the like may be mentioned.

As the polydiene-based thermoplastic elastomer, 1,2-polybutadiene-based TPE, trans-1,4-polyisoprene-based TPE, hydrogenated and conjugated diene-based TPE, epoxidized natural rubber and the like may be mentioned. 1,2-Polybutadiene-based TPE is polybutadiene having more than 90% of 1,2-binding in the molecule, and composed of crystalline syndiotactic 1,2-polybutadiene as the hard segment and amorphous 1,2-polybutadiene as the soft segment. Also, trans-1,4-polyisoprene-based TPE is polyisoprene having more than 98% of a structure of trans-1,4 in the molecule, and composed of crystalline trans 1,4 segments as the hard segment and amorphous trans 1,4 segments as the soft segment.

In general, polyvinyl chloride-based thermoplastic elastomer (TPVC) is roughly categorized into the following three types.

Type 1: high molecular weight polyvinyl chloride (PVC)/plasticized polyvinyl chloride (PVC) blended TPVC This is thermoplastic elastomer formed by using a high molecular weight PVC for the hard segment and PVC plasticized with a plasticizer for the soft segment. Since the high molecular weight PVC is used for the hard segment, a micro-crystalline portion has a function as the crosslinking point.

Type 2: partially crosslinked PVC/plasticized PVC blended TPVC

This is thermoplastic elastomer formed by using PVC having partial crosslinking or branched structure introduced thereto for the hard segment and PCV plasticized by the plasticizer for the soft segment.

Type 3: PVC/elastomer-alloy type TPVC

This is thermoplastic elastomer containing PVC as the hard segment and rubber such as partially crosslinked nitrile butadiene rubber (NBR) or TPE such as polyurethane-based TPE, polyester-based TPE and the like as the soft segment.

The chlorinated polyethylene-based thermoplastic elastomer is a soft resin which is obtained by reacting polyethylene with chlorine gas in a solvent such as aqueous suspension or carbon tetrachloride, and crystalline polyethylene block is used for the hard segment and chlorinated polyethylene (CPE) block is used for the soft segment. Note that, in the CPE block, both components of polyethylene and chlorinated polyethylene are mixed as a multi-block mixture of a random structure mixture.

The polyester-based thermoplastic elastomer (TPEE) is a multi-block copolymer having polyester as the hard segment in the molecule and polyether or polyester with low glass transition temperature (Tg) as the soft segment. TPEE may be categorized into the types described below based on a molecular structure, and mainly categorized into polyester-polyether type TPEE and polyester-polyester type TPEE.

(1) Polyester-Polyether Type TPEE

In general, this is thermoplastic elastomer having aromatic crystalline polyester as the hard segment and polyether as the soft segment.

(2) Polyester-Polyester Type TPEE

This is thermoplastic elastomer having aromatic crystalline polyester as the hard segment and aliphatic polyester as the soft segment.

(3) Liquid Crystal TPEE

This is thermoplastic elastomer having rigid liquid crystal molecules as the hard segment and aliphatic polyester as the soft segment.

The polyamide-based thermoplastic elastomer (TPA) is a multi-block copolymer having polyamide as the hard segment and polyether or polyester with a low Tg as the soft segment. Polyamide component composing the hard segment is selected from nylon 6, 66, 610, 11, 12 and the like, and mainly from nylon 6 and nylon 12. As a structure material of the soft segment, long-chain polyol such as polyether diols, polyester diols and the like may be used. Typical examples of polyether polyols may be diol poly(oxy tetramethylene)glycol (PTMG), poly(oxypropylene)glycol and the like. Typical examples of polyester polyols may be poly(ethylene adipate)glycol, poly(butylene-1,4 adipate) glycol and the like.

The fluorine resin-based thermoplastic elastomer is an ABA block copolymer having fluorine resin as the hard segment and fluorine rubber as the soft segment. The fluorine resin composing the hard segment may be tetrafluoroethylene-ethylene copolymer or polyvinylidene fluoride (PVDF) or the like. The fluorine rubber composing the soft segment may be vinylidene fluoride-hexafluoropropylene-tetrafluoroethylene terpolymers or the like. More specifically, vinylidene fluoride rubber, tetrafluoroethylene-propylene rubber, tetrafluoroethylene-perfluoro methyl vinyl ether rubber, phosphazene type fluorine rubber, fluoro polyether, fluoronitroso rubber, perfluoro triazine and the like may be contained. In fluorine resin-based TPE, microphase separation is occurred in a manner similar to other TPE and the hard segment forms the crosslinking point.

The polyurethane-based thermoplastic elastomer (TPU) is a straight-chain multi-block copolymer composed of (1) polyurethane obtained by reaction between short chain glycol and isocyanate as the hard segment and (2) polyurethane obtained by reaction between long chain glycol and isocyanate as the soft segment. Here, polyurethane is a general term of compounds having a urethane linkage (—NHCOO—) obtained by a polyaddition reaction (urethane reaction) of isocyanate (—NCO) and alcohol (—OH). According to the multilayer structure of the present invention, when elastomer forming the elastomer layer is TPU, the stretchability and the thermoformability may be improved by laminating the elastomer layer. Further, since such an inner liner may have improved interlayer adhesion between the elastomer layer and the barrier layer, high durability such as high crack resistance and the like may be obtained and, when the inner liner is deformed in use, the gas barrier property and the stretchability may be maintained.

The TPU is composed of polymeric polyol, organic polyisocyanate, a chain extender, and the like. The polymeric polyol is a substance having multiple hydroxy groups and may be obtained by polycondensation, addition polymerization (for example, ring-opening polymerization), polyaddition and the like. The polymeric polyol may be, for example, polyester polyol, polyether polyol, polycarbonate polyol or cocondensates thereof (for example, polyester-ether-polyol), or the like. Among them, polyester polyol and polycarbonate polyol are preferable, and polyester polyol is particularly preferable. Note that those polymer polyols may be used alone, or in combination with one or more other polymer polyols.

Here, the polyester polyol may be prepared by, for example, in accordance with a conventional method, condensation of compound that may form dicarboxylic acids, esters thereof, or anhydrides thereof and a low molecular weight polyol by direct esterification or transesterification, or by ring-opening polymerization of lactones.

Dicarboxylic acid that may be used to generate polyester polyol may be, but not particularly limited to, dicarboxylic acid which is commonly used in the production of polyester. Specifically, the dicarboxylic acid may be aliphatic dicarboxylic acid having 4 to 12 carbon atoms such as succinic acid, glutaric acid, adipic acid, pimelic acid, suberic acid, azelaic acid, sebacic acid, dodecanedioic acid, methyl succinic acid, 2-methyl glutaric acid, trimethyl adipic acid, 2-methyloctanic acid, 3,8-dimethyldecanic diacid, 3,7-dimethyldecanic diacid, and the like; cycloaliphatic dicarboxylic acid such as cyclohexanedicarboxylic acid and the like; aromatic dicarboxylic acid such as terephthalic acid, isophthalic acid, orthophthalic acid, naphthalene dicarboxylic acid, and the like. These dicarboxylic acids may be used alone, or in combination with one or more other dicarboxylic acids. Among them, aliphatic dicarboxylic acid having 6 to 12 carbon atoms is preferable, and adipic acid, azelaic acid and sebacic acid are particularly preferable. These dicarboxylic acids have a carbonyl group that more easily reacts with the hydroxy group and thus is capable of significantly improving the interlayer adhesion to the barrier layer.

The low molecular weight polyol that may be used to generate polyester polyol may be, but not particularly limited to, low molecular weight polyol that is commonly used in the production of polyester. Specifically, the low molecular weight polyol may be aliphatic diol having 2 to 15 carbon atoms such as ethylene glycol, diethylene glycol, triethylene glycol, propylene glycol, 1,3-propanediol, 2-methyl-1,3-propanediol, 1,3-butylene glycol, 1,4-butanediol, neopentyl glycol, 1,5-pentanediol, 3-methyl-1,5-pentanediol, 1,6-hexanediol, 1,8-octanediol, 2-methyl-1,8-octane diol, 2,7-dimethyl-1,8-octanediol, 1,9-nonanediol, 2-methyl-1,9-nonanediol, 1,10-decanediol, 2,2-diethyl-1,3-propanediol, and the like; or alicyclic diol such as1,4-cyclohexanediol, cyclohexanedimethanol, cyclooctanedimethanol, dimethyl cyclooctanedimethanol, and the like; aromatic dihydric alcohol such as 1,4-bis(β-hydroxyethoxy)benzene and the like. These low molecular weight polyols may be used alone, or in combination with one or more other low molecular weight polyols. Among them, aliphatic diol having 5 to 12 carbon atoms having a methyl group in a side chain of 3-methyl-1,5-pentanediol, 2-methyl-1,8-octanediol, 2,7-dimethyl-1,8-octanediol, 1,9-nonanediol, 2,8-dimethyl-1,9-nonanediol, and the like are preferable. Polyester polyol obtained by using such aliphatic diol may easily react with a hydroxyl group and thus is capable of significantly improving the interlayer adhesion to the barrier layer. Further, together with the low molecular weight polyol, a small amount of low molecular weight polyol having three or more functional groups may be used. The low molecular weight polyol having three or more functional groups may be, for example, trimethylol propane, trimethylol ethane, glycerin, 1,2,6-hexane triol, and the like.

Lactones that may be used to generate the polyester polyol may be, for example, ε-caprolactone, β-methyl-δ-valerolactone and the like.

The polyether polyols may be, for example, polyethylene glycol, polypropylene glycol, polytetramethylene glycol, poly(methyltetramethylene)glycol and the like. The polyether polyols may be used alone, or in combination with one or more other polyether polyols. Among them, polytetramethylene glycol is preferable.

The polycarbonate polyols may be, preferably, compound obtained from condensation polymerization of aliphatic diol having 2-12 carbon atoms such as, for example, 1,4-butanediol, 1,5-pentanediol, 1,6-hexanediol, 1,8-octanediol, 1,10-decanediol and the like or mixture thereof, by an action of diphenyl carbonate, phosgene and the like.

For the polymeric polyol, a lower limit of the number average molecular weight is preferably 500, more preferably 600, particularly preferably 700. On the other hand, an upper limit of the number average molecular weight of the polymeric polyol is preferably 8,000, more preferably 5,000, particularly preferably 3,000. When the number average molecular weight of the polymer polyol is less than the lower limit, compatibility with the organic polyisocyanate is so high that the elasticity of a resulting TPU becomes insufficient. Therefore, dynamic property such as the stretchability, and the thermoformability of a resulting inner liner may be deteriorated. On the other hand, when the number average molecular weight of the polymeric polyol exceeds the upper limit, the compatibility with the organic polyisocyanate is so low that mixing in the polymerization process becomes difficult. As a result, a stable TPU may not be obtained due to generation of mass in a gel state and the like. Note that the number average molecular weight of the polymer polyol is measured conforming to JIS-K-1577 and calculated on the basis of a hydroxy group value.

The organic polyisocyanate may be, but not particularly limited to, a known organic diisocyanate that is commonly used in the manufacture of TPU. As the organic diisocyanate, for example, aromatic diisocyanate such as 4,4'-diphenylmethane diisocyanate, tolylene diisocyanate, phenylene diisocyanate, xylylene diisocyanate, 1,5-naphthylene diisocyanate, 3,3'-dichloro-4,4'-diphenylmethane diisocyanate, toluylene diisocyanate and the like; and aliphatic diisocyanate or alicyclic diisocyanate such as hexamethylene diisocyanate, isophorone diisocyanate, 4,4'-dicyclohexylmethane diisocyanate, hydrogenated xylylene diisocyanate and the like may be mentioned. Among them, in terms of capability to improve strength and the crack resistance of a resulting inner liner, 4,4'-diphenylmethane diisocyanate is preferable. These organic polyisocyanates may be used alone, or in combination with one or more other organic polyisocyanates.

The chain extender may be, but not particularly limited to, a known chain extender commonly used in the manufacture of TPU, and low molecular weight compounds having 300 or less molecules having two or more active hydrogen atoms capable of reacting with an isocyanate group in the molecule are preferably used. As the chain extender, for example, ethylene glycol, propylene glycol, 1,4-butanediol, 1,6-hexanediol, 1,4-bis(β-hydroxyethoxy)benzene, 1,4-cyclohexanediol, and the like may be mentioned. Among them, in terms of further improving the stretchability and the thermoformability of the resulting inner liner, 1,4-butanediol is particularly preferred. These chain extenders may be used alone, or in combination with one or more other chain extenders.

The method of producing the TPU may be a manufacturing method using the polymer polyol, the organic polyisocyanate and the chain extender and utilizing a known urethane-forming reaction technique, and either one of prepolymer method and a one-shot method may be used. In particular, carrying out melt polymerization substantially in the absence of solvent is preferable, and carrying out continuous melt polymerization using a multi-screw extruder is more preferable.

For the TPU, a ratio of mass of the organic polyisocyanate to total mass of polymer polyol and the chain extender [isocyanate/(polymeric polyol+chain extender)] is preferably 1.02 or less. When the ratio is more than 1.02, there is a risk of deteriorating long-term operation stability at the time of molding.

(Outermost Layer)

The outermost layer 4 in the multilayer structure of the present invention, as illustrated in FIG. 1, is a layer laminated on top of the layers constituting the multilayer structure 1. When the multilayer structure 1 is used as the inner liner, the outermost layer 4 is a layer located on a tire outermost side. In order to secure the adhesion to a surface 5a of the rubber material 5, the outermost layer 4 needs to contain the elastomer component which may heat-adhere to diene rubber. Here, the heat-adhering means adhesion of the pneumatic tire and the outermost layer by heating the inner liner while pasted to the inner surface of the pneumatic tire.

Although the outermost layer 4 is separately provided in FIG. 1, when the elastomer layer 3 contains the elastomer component which may heat-adhere to diene rubber, the elastomer layer 3 may have a function as the outermost layer 4.

Here, the elastomer component which may heat-adhere to the diene rubber is not particularly limited as long as, as a member forming the inner liner, having certain air barrier property and crack resistance and is capable of heat-adhering to the diene rubber. In terms of having high barrier property and crack resistance, the elastomer component is preferably a polymer having a vulcanizable diene moiety such as, for example, natural rubber (NR), butadiene rubber (BR), isoprene rubber (IR), styrene-butadiene rubber (SBR), and modified polymers thereof.

Preferably, the elastomer component of the outermost layer has a urethane bond, as it may ensure flexibility while having excellent adhesion between the inner surface of the tire and the barrier layer.

Preferably, also, the elastomer component of the outermost layer has a modified group capable of combining with a hydroxyl group (an OH group). This is because, when the resin composition forming the barrier layer contains the hydroxy group, high adhesion may be achieved by making a hydrogen bond with the barrier layer. Here, as the modifying group capable of combining with the hydroxy group, for example, an epoxy group, an isocyanate group, a carboxyl group and the like may be mentioned.

An amount of the elastomer component comprised in the outermost layer is preferably 20 mass % or more. When the content of the elastomer component is less than 20 mass %, due to lack of the content, sufficient adhesion to the inner surface of the pneumatic tire may not be ensured. Also, in terms of obtaining superior adhesion, the amount of the elastomer component is more preferably 50 mass % or more.

A thickness of the outermost layer is preferably in a range of 1-1000 μm. This is because, when the thickness is less than 1 μm, there is a possibility that sufficient adhesion of the outermost layer to the inner surface of the pneumatic tire may not be obtained and, when the thickness exceeds 1000 μm, due to an exceeding thickness of the outermost layer, there is a possibility of causing increase in the mass of the tire.

As a method to adhere the multilayer structure of the present invention and the rubber material, disposing the multilayer structure on a surface of the rubber material and adhering them by vulcanization is preferable. This is because, without separately providing the adhesive layer, the inner liner may adhere to the inner surface of the pneumatic tire.

Note that vulcanization conditions are not particularly limited, as long as that are normally used, and the vulcanization may be carried out at a temperature of, for example, 120° C. or higher, preferably 125° C.-200° C., more preferably 130-180° C.

(Method for Producing Multilayer Structure)

A method for producing the multilayer structure according to the present invention is not particularly limited, as long as it may satisfactorily laminate and adhere the barrier layer and the elastomer layer described above, and may be a known method such as, for example, coextrusion, hand setting, coating, bonding, adherence and the like. Among them, a suitable method for producing the multilayer structure according to the present invention is a method in which a plurality of resin compositions are prepared and the multilayer structure comprising the barrier layer is produced by a co-extrusion method using those compositions. This is because the method has high productivity and a resulting multilayer structure has excellent interlayer adhesion. The outermost layer may also be produced by the co-extrusion method.

In the co-extrusion method, the resin or the resin composition forming the barrier layer is heated and melted, and then supplied to an extrusion die through each path from different extruders or pumps, extruded to the multilayer from the extrusion die, and adheres in a laminating manner. Thereby, the multilayer structure according to the present invention is formed. As the extrusion die, for example, a multi-manifold die, a field block, a static mixer or the like may be used.

According to the multilayer structure of the present invention, also, on one side or on both sides thereof, a support layer for supporting the multilayer structure may be laminated. The support layer may be, but not particularly limited to, for example, a synthetic resin layer commonly used as a support layer. A laminating method of the support layer on the barrier layer and the elastomer layer may be, but not particularly limited to, for example, an adhesion method using an adhesive, an extrusion lamination method or the like.

<Inner Liner for Pneumatic Tire>

Next, with reference to the drawings, the inner liner of the present invention for a pneumatic tire and the pneumatic tire according to the present invention will be described in detail. The inner liner of the present invention for the pneumatic tire is characterized in having the multilayer structure described above.

<Pneumatic Tire>

The pneumatic tire according to the present invention is characterized in having the inner liner. The pneumatic tire according to the present invention may be manufactured by applying the multilayer structure described above as an inner liner 12 and using a conventional method.

In the pneumatic tire of the present invention, rubber composing the tire and the inner liner 12 may adhere to each other by using adhesive.

Figure 2:
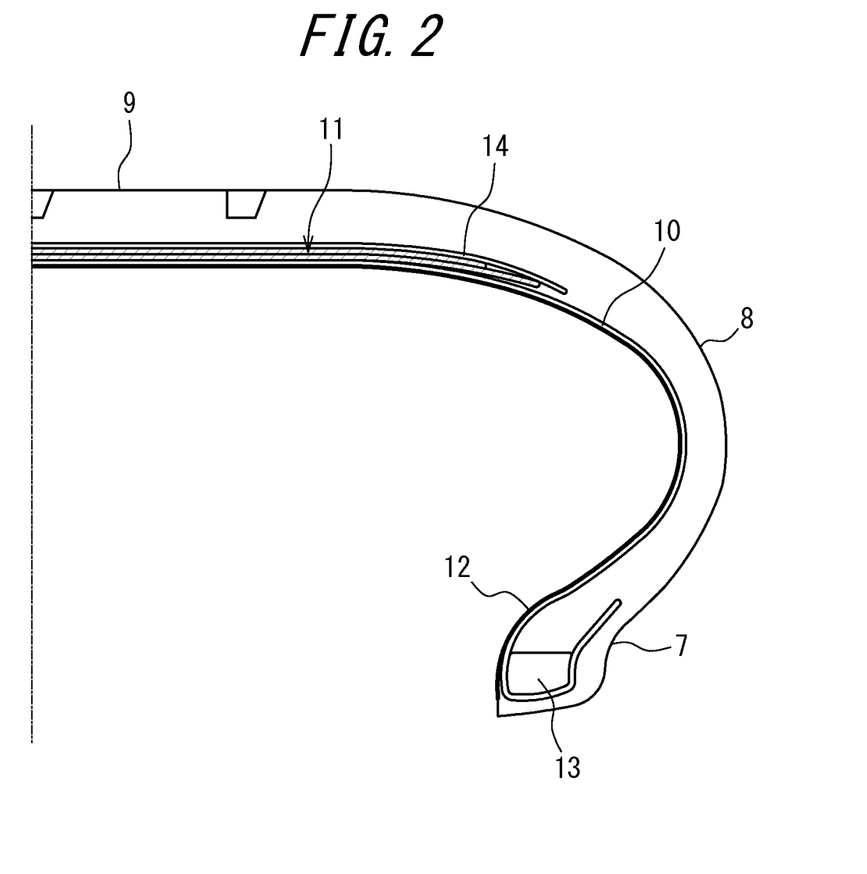
FIG. 2 is a partial cross-sectional view of an example of a pneumatic tire according to the present invention.

FIG. 2 is a partial cross-sectional view of an example of the pneumatic tire according to the present invention. The tire illustrated in FIG. 2 includes a pair of bead portions 7, a pair of sidewall portions 8, a tread portion 9 communicating with both of the sidewall portions 8, a carcass 10 troidally extending between the pair of bead portions 7 for reinforcing each of the portions 7, 8 and 9, and a belt 11 made up of two belt layers arranged outside a crown portion of the carcass 10 in a tire radial direction. Further, the inner liner 12 is disposed on a tire inner surface inside the carcass 10.

In the tire illustrated in the figure by way of example, the carcass 10 includes a main body portion troidally extending between a pair of bead cores 13, each of which is embedded in the bead portion 7, and a folding portion folded up radially outwardly from an inner side in a tire width direction around each of the bead cores 13. In the tire according to the present invention, however, the number of plies and a structure of the carcass 10 are not limited thereto.

Further, although the belt 11 in the tire illustrated in the figure by way of example is made up of two belt layers, the number of belt layers for forming the belt 11 in the tire according to the present invention is not limited thereto. Here, the belt layer is usually formed by using a rubberized layer of a code extending obliquely with respect to a tire equatorial plane and, in the two belt layers, codes constituting the belt layers are laminated to intersect with each other across the equatorial plane, thereby forming the belt 11. Further, although the tire illustrated in the figure by way of example includes a belt reinforcing layer 14 disposed so as to cover the entire belt 11 outside of the belt 11 in the tire radial direction, the tire of the present invention does not need to have the belt reinforcing layer 14, or may have a belt reinforcing layer with another structure. Here, usually, the belt reinforcing layer 14 is formed by the rubberized layer of codes arranged in substantially parallel with respect to a tire circumferential direction.

In the pneumatic tire, the inner surface of the tire to adhere to the inner liner 12 of the present invention may include butyl rubber and halogenated butyl rubber. Here, as the halogenated butyl rubber, chlorinated butyl rubber, brominated butyl rubber and modified rubber thereof may be mentioned. Also, as the halogenated butyl rubber, commercially available products such as, for example, "Enjay Butyl HT10-66" (registered trademark) [chlorinated butyl rubber produced by Enjay Chemical Corporation], "Bromobutyl 2255" (registered trademark) [brominated butyl rubber produced by JSR Corporation], and "Bromobutyl 2244" (registered trademark) [brominated butyl rubber produced by JSR Corporation] may be used. Further, as an example of chlorinated or brominated modified rubber, "Exxpro50" (registered trademark) [produced by Exxon] may be mentioned.

Content rates of butyl rubber and/or halogenated butyl rubber in the rubber component, in terms of improving resistance to oxygen permeability, is preferably 50% by mass or more, more preferably 70-100% by mass. Here, as the rubber component described above, other than butyl rubber and halogenated butyl rubber, diene rubber or epichlorohydrin rubber may be used. These rubber components may be used alone, or in combination with one or more other types of rubber components.

Specifically, as the diene rubber, natural rubber (NR), isoprene rubber (IR), cis-1,4-polybutadiene (BR), syndiotactic-1,2-polybutadiene (1,2 BR), styrene-butadiene copolymer rubber (SBR), acrylonitrile-butadiene rubber (NBR), chloroprene rubber (CR) and the like may be mentioned. These diene rubber may be used alone, or in combination with one or more other diene rubber.

In the pneumatic tire, in addition to the rubber component, compounding agents commonly used in the rubber industry such as, for example, reinforcing fillers, softeners, antioxidants, vulcanizing agents, vulcanization accelerators for rubber, scorch inhibitor, zinc white, stearic acid and the like may be appropriately blended in accordance with the intended use. As these compounding agents, commercially available products may be appropriately used.

EXAMPLES

The following describes the present invention in more detail by using Examples. However, the present invention is not limited to the following Examples in any manners.

(Elastomer Layer 1)

A thermoplastic polyurethane (TPU) (Kuramiron 3190 produced by Kuraray Co., Ltd.) was used as an elastomer layer 1. Elongation at break of the elastomer layer 1 was 400%.

(Elastomer Layer 2)

To a 20 L stainless steel reactor filled with nitrogen, 8000 g of hexane and 2000 g of 1,3-butadiene were added and the mixture was heated at 70° C. While the mixture was stirred, 21 ml of hexane solution of diisobutylaluminum hydride (20%), 2.5 ml of hexane solution of ethylaluminium sesquichloride (20%), and 2.75 ml of neodymium versatight (8.8%) were added to the mixture. Then, 60 minutes later, 10 g of hexamethylene diisocyanate was dissolved in 200 ml of hexane, which was then added to the mixture, and 4 g of ethylene glycol and 0.15 ml of dibutyltin laurate were dissolved in 200 ml of hexane. Then, 60 minutes later, 4 g of "Irganox 1520" was dissolved in 100 ml of hexane, which was added to the mixture. Subsequently, a polymer was precipitated in 15 L of isopropanol and dried, and resulting urethane-modified polybutadiene (butadiene TPU) was used as an elastomer layer 2. Elongation at break of the elastomer layer 2 was 400%.

(Elastomer layer 3)

A rubber composition containing butadiene rubber (BR01 produced by JSR Corporation) and 5 parts by mass of thermoplastic polyurethane (TPU) [Kuramiron 3190 produced by Kuraray Co., Ltd.] with respect to 100 parts by mass of the butadiene rubber was used as an elastomer layer 3. Elongation at break of the elastomer layer 2 layer 3 was 600%.

(Elastomer Layer 4)

In a 20 L of stainless steel reactor, 2000 g of urethane-modified polybutadiene synthesized in the production of the elastomer layer 2 described above was dissolved in 8000 g of toluene, and temperature of a resulting mixture was maintained at 50° C. Subsequently, while the mixture was stirred, 240 ml of formic acid was added thereto and 1000 g of hydrogen peroxide solution (30 wt %) was dropped thereinto little by little while stirring was continued. Four hours later, Irganox 1520 was dissolved in 100 ml of toluene and added to the mixture. Then, polymer was precipitated in 15 L of isopropanol and dried, and resulting urethane-modified epoxidized polybutadiene was used as an elastomer layer 4. Elongation at break of the elastomer layer 4 was 550%.

(Barrier Layer 1)

"EVAL E-105" produced by Kuraray Co., Ltd. was used as a barrier layer 1 made of ethylene-vinyl alcohol copolymer. Note that oxygen permeability of the barrier layer 1 was 0.03 cc·mm/m2·day·atm, and elongation at break was 15%.

(Barrier Layer 2)

"Nylon Ube5033B" produced by Ube Industries, Ltd. was used as a barrier layer 2. Oxygen permeability of this resin was 1.1 cc·mm/m2·day·atm, and elongation at break was 20%.

(Barrier Layer 3)

A mixture containing brominated butyl rubber (Bromobutyl2244 produced by JSR Corporation) and, with respect to 100 parts by mass of the brominated butyl rubber, 300 parts by mass of a resin composition of ethylene-vinyl alcohol copolymer used for a barrier layer 4, which will be described below, was used as a barrier layer 3.

(Barrier Layer 4)

Ethylene-vinyl alcohol copolymer with 99.9% saponification degree containing 44 mol % ethylene (190° C., MFR under the load of 2160 g: 5.5 g/10 minutes) was crushed into fine particles having a diameter about 2 mm by a grinder and, once again, thoroughly washed in a large quantity of distilled water. The washed particles were vacuum-dried at room temperature for 8 hours and then melted at 200° C. by using a twin-screw extruder (screw: 20 mmφ, full flight, cylinder-die temperature setting: C1/C2/C3-die=200/200/200/200° C.). A resulting pelletized resin composition was used for the barrier layer 4.

Note that the ethylene content of the ethylene-vinyl alcohol copolymer and the saponification degree described above are values calculated from a spectrum obtained by 1H-NMR measurement [using "JNM-GX-500 type" manufactured by JEOL Ltd.] using deuterated dimethyl sulfoxide as a solvent. Also, the melt flow rate (MFR) of the ethylene-vinyl alcohol copolymer was obtained, by filling a cylinder Melt Indexer L244 having an internal diameter of 9.55 mm and a length of 162 mm [manufactured by Takara Kogyo Co., Ltd.] with a sample and melting the sample at 190° C. and then uniformly applying a load by using a plunger having a diameter of 9.48 mm weighing 2160 g, from an amount of resin (g/10 min) extruded per unit time from a 2.1 mm diameter orifice provided at a center of the cylinder. However, when a melting point of the ethylene-vinyl alcohol copolymer is near or over 190° C., measurement was carried out under the load of 2160 g at a plurality of temperatures, and a reciprocal of an absolute temperature was plotted on a horizontal axis in a single logarithmic chart and a logarithm of the MFR on a vertical axis. Then, a value calculated by extrapolating with 190° C. was used as the melt flow rate (MFR).

Samples 1-16 of Examples and Comparative Examples

Thereafter, in order to form a multilayer structure comprising layers of the number and the thickness shown in Table 1 by using the materials of the barrier layer and the elastomer layer, when using the barrier layer 1 and the barrier layer 2 at 210° C., the melt at 220° C. was supplied to a feed block from the co-extruder and extruded from the feed block. Thereby, the multilayer structure was produced. Note that the outermost layer is the elastomer layer in the present sample.

Thus obtained multilayer was quenched on a casting drum having a surface temperature maintained at 25° C. to which electrostatic is applied. A casted film obtained by quench was pressed against a release paper and wound up. Note that a shape of a flow path and a total ejection amount were set such that a time from merging of the melt to quench on the casting drum took approximately 4 minutes.

Cross-sections of the cast films obtained in the above manners were observed by using DIGITAL MICROSCOPE VHX-900 (manufactured by KEYENCE CORPORATION) or an electron microscope VE-8800 (manufactured by KEYENCE CORPORATION), such that an average thickness of each of the layers and a thickness of the entire multilayer structure obtained at a later step were obtained. Results are shown in Table 1.

Subsequently, for each sample cast film, by using [Cure Tron EB200-100 manufactured by NHV Corporation], electron beams in an irradiation dose shown in Table 1 were irradiated at an acceleration voltage of 200 kV. Thereby, a crosslinked multilayer film (multilayer structure) was obtained.

Thereafter, a rubber composition of the following formulation was prepared to produce an unvulcanized rubber-like elastic sheet with a thickness of 2 mm, to which the multilayer structure subjected to irradiation of electron beams adheres, and a resulting multilayer structure was subjected to a vulcanization process at 160° C. for 15 minutes. Thus, each sample of Examples and Comparative Examples was produced.

(Rubber Composition)

| | |
|---|---|
| natural rubber | 100 pts. mass |
| brominated butyl rubber [Bromobutyl 2244 produced by JSR Corporation] | 40 pts. mass |

-continued

| | |
|---|---|
| GPF carbon black [# 55 produced by Asahi Carbon Co., Ltd.] | 10 pts. mass |
| SUNPAR2280 [produced by Japan Sun Oil Company, Ltd.] | 1 pts. mass |
| stearic acid [produced by ADEKA CORPORATION] | 2 pts. mass |
| vulcanization accelerator [Nocceler DM produced by OUCHI SHINKO CHEMICAL INDUSTRIAL CO., LTD.] | 0.5 pts. mass |
| zinc oxide [produced by Hakusuitech Co., Ltd.] | 1 pts. mass |
| sulfur [produced by Karuizawa Refinery] | 3 pts. mass |

Then, adhesiveness, the gas barrier property, the crack resistance, the fatigue resistance and the internal pressure retention of each sample produced in the above manner were evaluated in the following manners. Results are shown in Table 1 and Table 2.

(1) Adhesiveness

For each sample described above, adhesiveness was measured (N/25 mm) conforming to JIS Z 0237 under conditions of 90° peel and a peel rate of 300 mm/min. Results are shown in Table 1.

For evaluation, with respect to a value of a sample 10 as 100, other values are represented by indexes. The larger the value is, the better the adhesiveness is.

(2) Gas Bather Property

Each sample described above was conditioned at 20° C. and 65% RH for 5 days. For two resulting conditioned films, by using MOCON OX-TRAN2/20 type manufactured by Modern Control Co. Ltd., conforming to JIS K7126 (equal pressure method) under the conditions of 20° C. and 65% RH, the oxygen permeability was measured and an average thereof was obtained. For the gas barrier property, evaluation was carried out using an index with respect to an air permeability of a sample 1 as 100. The smaller the value is, the smaller the air permeability is and thus the better the result is. smaller the value is, the smaller the air permeability is and thus the better the result is.

(3) Crack Resistance

Each sample described above was punched in a shape of dumbbell of JIS No. 2 (JISK 6251) and, in the atmosphere at −30° C., subjected to a constant strain fatigue test. The test was conducted under conditions with an inter-chuck distance of 50 mm, distortion at 50% and repetitive tensile frequency at 5 Hz, to count the number of iterations until a visible crack appeared on a sample surface. For evaluation, × represents 100 million times or less, and ◯ represents 100 million times or more.

(4) Fatigue Resistance (the Number of Cracks After Low-Temperature Drum Running Test)

By using each of the above films as the inner liner, a pneumatic tire (195/65R15) having a structure illustrated in FIG. 2 was manufactured according to a conventional manner. Then, thus produced pneumatic tire, in the atmosphere at a temperature of −30° C. under the air pressure at 140 kPa, was pressed with a load of 6 kN on a rotary drum running at a speed corresponding to 80 km/h, and run for 10,000 km. Appearance of the tire after drum running was visually observed to evaluate existence of cracks.

(5) Internal Pressure Retention

A tire described above was, in the atmosphere of −30° C. at the air pressure of 140 kPa, pressed with a compression force of 6 kN on a rotary drum corresponding to a speed at 80 km/h and run for 10,000 km. Then, after mounting the tire (test tire) which has been running as described above on a rim of 6 JJ×15, the tire was left standing with the internal pressure at 240 kPa, for 3 months. Three month later, the internal pressure was measured and, by using the following formula:

Internal pressure retention=((240−$b$)/(240−$a$))×100

[in this formula, a represents the internal pressure (kPa) of the test tire of 3 months later, b represents an internal pressure (kPa) of a test tire of Comparative Example 1 of 3 month later], the internal pressure retention was evaluated. With a value of a sample 11 as 100, other values were represented by indexes. The larger the index is, the better the internal pressure retention is.

TABLE 1

| | | Sample No. | | | | | | | | |
|---|---|---|---|---|---|---|---|---|---|---|
| | | 1 Example | 2 Example | 3 Example | 4 Example | 5 Example | 6 Example | 7 Example | 8 Example | 9 Comparative Example |
| Barrier Layer | Type | Barrier Layer 1 | Barrier Layer 1 | Barrier Layer 1 | Barrier Layer 1 | Barrier Layer 2 | Barrier Layer 2 | Barrier Layer 2 | Barrier Layer 1 | Barrier Layer 1 |
| | Average Layer Thickness (μm) | 1 | 1 | 1 | 0.5 | 0.8 | 0.8 | 0.8 | 1 | 1 |
| | Number of Layers | 10 | 10 | 10 | 10 | 10 | 10 | 10 | 10 | 10 |
| Elastomer Layer | Type | Elastomer Layer 2 | Elastomer Layer 3 | Elastomer Layer 4 | Elastomer Layer 4 | Elastomer Layer 2 | Elastomer Layer 3 | Elastomer Layer 4 | Elastomer Layer 3 | Elastomer Layer 1 |
| | Average Thickness of Layer between Barrier Layers (μm) | 3 | 3 | 3 | 1.5 | 2.2 | 2.2 | 2.2 | 3 | 3 |
| | Thickness of Outermost Layer (μm) | 20 | 20 | 20 | 25 | 10 | 10 | 10 | 3 | 20 |
| | Number of Layers | 11 | 11 | 11 | 11 | 11 | 11 | 11 | 11 | 11 |
| Ratio of Thickness Occupied by Elastomer layer in Multilayer Structure (%) | | 87.0 | 87.0 | 87.0 | 92.7 | 83.3 | 83.3 | 83.3 | 76.7 | 87.0 |
| Total Number of Layers | | 21 | 21 | 21 | 21 | 21 | 21 | 21 | 21 | 21 |
| Thickness of Multilayer Structure (μm) | | 77 | 77 | 77 | 68.5 | 47.8 | 47.8 | 47.8 | 43 | 77 |
| Amount of Electron Beam (kGy) | | 200 | 200 | 200 | 200 | 150 | 150 | 150 | 200 | 200 |
| Adhesiveness (Index) | | 120 | 105 | 180 | 170 | 125 | 110 | 190 | 100 | 10 |
| Gas Barrier Property (Index) | | 100 | 100 | 100 | 190 | 700 | 700 | 700 | 100 | 100 |

TABLE 1-continued

|  | Sample No. | | | | | | | | |
| --- | --- | --- | --- | --- | --- | --- | --- | --- | --- |
|  | 1 Example | 2 Example | 3 Example | 4 Example | 5 Example | 6 Example | 7 Example | 8 Example | 9 Comparative Example |
| Crack Resistance, Presence of Cracks | ○ | ○ | ○ | ○ | ○ | ○ | ○ | X | ○ |
| Presence of Cracks after Low Temperature Drum Running Test | No | No | No | No | No | No | No | Yes | No |
| Internal Pressure Retention (Index) | 100 | 100 | 100 | 60 | 30 | 30 | 30 | 10 | 100 |

TABLE 2

|  |  | Sample No. | | | | | | |
| --- | --- | --- | --- | --- | --- | --- | --- | --- |
|  |  | 10 Comparative Example | 11 Comparative Example | 12 Example | 13 Example | 14 Example | 15 Example | 16 Example |
| Barrier Layer | Type | Barrier Layer 3 | Barrier Layer 4 | Barrier Layer 4 | Barrier Layer 4 | Barrier Layer 4 | Barrier Layer 4 | Barrier Layer 4 |
|  | Average Layer Thickness (μm) | 10 | 10 | 10 | 10 | 10 | 1 | 1 |
|  | Number of Layers | 1 | 1 | 1 | 1 | 1 | 12 | 12 |
| Elastomer Layer | Type | Elastomer Layer 1 | Elastomer Layer 1 | Elastomer Layer 2 | Elastomer Layer 3 | Elastomer Layer 4 | Elastomer Layer 2 | Elastomer Layer 4 |
|  | Average Thickness of Layer between Barrier Layers (μm) | 10 | 10 | 10 | 10 | 10 | 1 | 1 |
|  | Thickness of Outermost Layer (μm) | 10 | 10 | 10 | 10 | 10 | 1 | 1 |
|  | Number of Layers | 2 | 2 | 2 | 2 | 2 | 13 | 13 |
| Ratio of Thickness Occupied by Elastomer layer in Multilayer Structure (%) | | 66.7 | 66.7 | 66.7 | 66.7 | 66.7 | 52.0 | 52.0 |
| Total Number of Layers | | 3 | 3 | 3 | 3 | 3 | 25 | 25 |
| Thickness of Multilayer Structure (μm) | | 30 | 30 | 30 | 30 | 30 | 25 | 25 |
| Amount of Electron Beam (kGy) | | 200 | 200 | 150 | 150 | 150 | 200 | 200 |
| Adhesiveness (Index) | | 100 | 98 | 600 | 120 | 500 | 500 | 400 |
| Gas Barrier Property (Index) | | 100 | 210 | 100 | 100 | 110 | 210 | 230 |

As can be seen from the results shown in Table 1 and Table 2, by including a component that may heat-adhere to diene rubber in the elastomer layer, excellent adhesiveness is shown while the gas barrier property may be maintained or improved.

Also, as can be seen from the results shown in Table 1, by setting the ratio of the thickness of the elastomer layers occupying the multilayer structure within the range according to the present invention, the internal pressure retention and the crack resistance are further improved. Further, using a polymer having the vulcanizable diene moiety as the elastomer compound, adhesiveness to diene rubber may be further improved.

INDUSTRIAL APPLICABILITY

According to the present invention, the multilayer structure that may adhere to the rubber material without the necessity of providing the adhesive layer may be provided. Also, an inner liner for a pneumatic tire having such a multilayer structure and a pneumatic tire having the inner liner may be provided.

REFERENCE SIGNS LIST 1 multilayer structure
2 barrier layer
3 elastomer layer
4 outermost layer
5 rubber material
7 bead portion
8 sidewall portion
9 tread portion
10 carcass
11 belt
12 inner liner
13 bead core

The invention claimed is:

1. A multilayer structure comprising a barrier layer containing a gas barrier resin and an elastomer layer containing thermoplastic elastomer,
   wherein an outermost layer laminated uppermost among layers constituting the multilayer structure contains an elastomer component that may heat-adhere to diene rubber,
   wherein the elastomer component of the outermost layer is a polymer containing both of a vulcanizable diene moiety which is derived from modified natural rubber, modified butadiene rubber, modified isoprene rubber, or modified styrene-butadiene rubber and urethane bond therein so as to improve flexibility of the outermost layer and adhesion between the outermost layer and an inner surface of a tire.

2. The multilayer structure according to claim 1, wherein a ratio of a thickness of the elastomer layers occupying the multilayer structure is 80% or more.

3. The multilayer structure according to claim 1, wherein the outermost layer and an inner surface of a tire adhere to each other by vulcanization.

4. The multilayer structure according to claim 1, wherein elongation at break of the barrier layer conforming to JIS K 7113 at 20° C. and 65% RH is 100% or less.

5. The multilayer structure according to claim 1, wherein the barrier layers and the elastomer layers are laminated to form seven or more layers in total.

6. The multilayer structure according to claim 5, wherein the barrier layers and the elastomer layers are alternately laminated.

7. The multilayer structure according to claim 5, wherein the barrier layers and the elastomer layers are laminated to form fifteen or more layers in total.

8. The multilayer structure according to claim 1, wherein the barrier layer and the elastomer layer are crosslinked by irradiation of active energy rays.

9. The multilayer structure according to claim 1, wherein oxygen permeability of the barrier layer at 20° C. and 65% RH is 10.0 cc·mm/m$^2$·day·atm or less.

10. The multilayer structure according to claim 1, wherein a thickness of the barrier layer is 10 μm or less.

11. The multilayer structure according to claim 1, wherein the gas barrier resin of the barrier layer is one or more resins having a polar group of carboxyl group, a carbonyl group, an amino group, an amide residue, OH, S, Cl or F.

12. The multilayer structure according to claim 11, wherein the gas barrier resin of the barrier layer has a hydroxy group.

13. The multilayer structure according to claim 12, wherein the elastomer component of the outermost layer has a modified group that may bond with the hydroxy group of the gas barrier resin.

14. The multilayer structure according to claim 11, wherein the gas barrier resin of the barrier layer is ethylene-vinyl alcohol copolymer, modified ethylene-vinyl alcohol copolymer, polyamide or polyvinyl alcohol.

15. The multilayer structure according to claim 1, wherein the elastomer layer includes at least one selected from polystyrene-based thermoplastic elastomer, polyolefin-based thermoplastic elastomer, polydiene-based thermoplastic elastomer, polyvinyl chloride-based thermoplastic elastomer, chlorinated polyethylene-based thermoplastic elastomer, polyurethane-based thermoplastic elastomer, polyester-based thermoplastic elastomer, polyamide-based thermoplastic elastomer and fluorine resin-based thermoplastic elastomer.

16. The multilayer structure according to claim 1, wherein the inner liner is produced by co-extrusion molding.

17. An inner liner for a pneumatic tire using the multilayer structure according to claim 1.

18. A pneumatic tire comprising the inner liner for a pneumatic tire according to claim 17.

19. The multilayer structure according to claim 1, wherein the modified natural rubber, modified butadiene rubber, modified isoprene rubber, or modified styrene-butadiene rubber is epoxidized natural rubber, epoxidized butadiene rubber, epoxidized isoprene rubber, or epoxidized styrene-butadiene rubber.

20. The multilayer structure according to claim 1, wherein elongation at break of the elastomer layer conforming to JIS K 7113 at 20° C. and 65% RH exceeds 100%.

* * * * *